US012657076B2

(12) United States Patent
Vityaz

(10) Patent No.: US 12,657,076 B2
(45) Date of Patent: *Jun. 16, 2026

(54) SYSTEM AND METHOD FOR PROCESSING DATA OF ANY EXTERNAL SERVICES THROUGH API CONTROLLED UNIVERSAL COMPUTING ELEMENTS

(71) Applicant: Corezoid, Inc., Wilmington, DE (US)

(72) Inventor: Oleksandr Vityaz, Dnipropetrovsk (UA)

(73) Assignee: Corezoid, Inc., Wilmington, DE (US)

( * ) Notice: Subject to any disclaimer, the term of this patent is extended or adjusted under 35 U.S.C. 154(b) by 176 days.

This patent is subject to a terminal disclaimer.

(21) Appl. No.: 18/615,344

(22) Filed: Mar. 25, 2024

(65) Prior Publication Data

US 2024/0272968 A1 Aug. 15, 2024

Related U.S. Application Data

(63) Continuation of application No. 17/388,341, filed on Jul. 29, 2021, now Pat. No. 11,941,462, which is a
(Continued)

(51) Int. Cl.
G06F 9/54 (2006.01)
G06F 9/448 (2018.01)
G06Q 10/10 (2023.01)

(52) U.S. Cl.
CPC ............ *G06F 9/546* (2013.01); *G06F 9/4498* (2018.02); *G06F 9/547* (2013.01); *G06Q 10/10* (2013.01)

(58) Field of Classification Search
CPC ........ G06F 9/546; G06F 9/4498; G06F 9/547; G06Q 10/10
See application file for complete search history.

(56) References Cited

U.S. PATENT DOCUMENTS 5,999,986 A 12/1999 McCauley, III et al.
6,718,533 B1 4/2004 Schneider et al.
(Continued)

FOREIGN PATENT DOCUMENTS

WO 2023009737 2/2023
WO 2023009762 2/2023

OTHER PUBLICATIONS

Schneider, Stefan, Lars Dietrich Klenner, and Holger Karl. "Every node for itself: Fully distributed service coordination." 2020 16th International Conference on Network and Service Management (CNSM). (Year: 2020).*
(Continued)

*Primary Examiner* — Thuy Dao
*Assistant Examiner* — Joanne G Macasiano
(74) *Attorney, Agent, or Firm* — BEKIARES ELIEZER LLP

(57) ABSTRACT

A method includes receiving, by a first universal computing element (UCE), from at least one application programming interface (API), a second UCE associated with another process of a first object. The first UCE transmits information including at least one parameter of the first object to the second UCE. The second UCE creates a second object including the at least one parameter of the first object, receives the second object, transmits a request to an API, and sets at least one parameter of the second object. A third UCE of a second process receives the second object and transmits information including the at least one parameter of the second object to a second UCE of the first process. The second UCE of the first process receives the first object, and sets at least one parameter of the first object based on the information.

20 Claims, 20 Drawing Sheets

Related U.S. Application Data continuation-in-part of application No. 16/252,075, filed on Jan. 18, 2019, now Pat. No. 11,237,835, which is a continuation-in-part of application No. 15/268,802, filed on Sep. 19, 2016, now abandoned, said application No. 16/252,075 is a continuation-in-part of application No. 15/077,626, filed on Mar. 22, 2016, now abandoned, said application No. 17/388, 341 is a continuation-in-part of application No. 16/027,926, filed on Jul. 5, 2018, which is a continuation-in-part of application No. 15/268,802, filed on Sep. 19, 2016, now abandoned, said application No. 16/027,926 is a continuation-in-part of application No. 15/077,626, filed on Mar. 22, 2016, now abandoned.

(60) Provisional application No. 62/221,124, filed on Sep. 21, 2015, provisional application No. 62/137,079, filed on Mar. 23, 2015, provisional application No. 63/213,114, filed on Jun. 21, 2021.

(56) References Cited

U.S. PATENT DOCUMENTS

| | | | |
|---|---|---|---|
| 7,051,330 | B1 | 5/2006 | Kaler et al. |
| 7,093,207 | B1 | 8/2006 | Laio et al. |
| 7,962,382 | B1 | 6/2011 | Tancredi et al. |
| 8,381,094 | B1 | 2/2013 | Prasad et al. |
| 9,836,339 | B1 * | 12/2017 | Engers ................. G06F 9/4484 |
| 11,237,835 | B2 | 2/2022 | Vityaz |
| 11,941,462 | B2 | 3/2024 | Vityaz |
| 2003/0055938 | A1 | 3/2003 | Barzilai |
| 2004/0117370 | A1 | 6/2004 | Dutta et al. |
| 2009/0182610 | A1 | 7/2009 | Palanisamy et al. |
| 2009/0254971 | A1 | 10/2009 | Herz et al. |
| 2011/0295949 | A1 | 12/2011 | Calsyn et al. |
| 2012/0227044 | A1 | 9/2012 | Arumugham et al. |
| 2012/0233547 | A1 | 9/2012 | McLachlan |
| 2013/0091506 | A1 | 4/2013 | Boris |
| 2013/0138593 | A1 | 5/2013 | Miller et al. |
| 2013/0304903 | A1 | 11/2013 | Mick et al. |
| 2014/0047272 | A1 | 2/2014 | Breternitz et al. |
| 2014/0129936 | A1 | 5/2014 | Richards et al. |
| 2015/0199274 | A1 | 7/2015 | Klein et al. |
| 2016/0034883 | A1 | 2/2016 | Amos et al. |
| 2016/0291942 | A1 | 10/2016 | Hutchison |
| 2017/0048123 | A1 | 2/2017 | Sun et al. |
| 2017/0221240 | A1 | 8/2017 | Stetson et al. |
| 2018/0032980 | A1 | 2/2018 | Rodriguez et al. |
| 2018/0069751 | A1 | 3/2018 | Guo et al. |
| 2018/0288506 | A1 | 10/2018 | Muller et al. |
| 2018/0293701 | A1 | 10/2018 | Appu et al. |
| 2018/0343217 | A1 | 11/2018 | Sedan et al. |
| 2019/0007489 | A1 | 1/2019 | Vityaz |
| 2019/0155741 | A1 | 5/2019 | Linke |
| 2019/0199693 | A1 | 6/2019 | Vityaz |
| 2019/0245918 | A1 | 8/2019 | Xu et al. |
| 2019/0250922 | A1 | 8/2019 | Vityaz |
| 2019/0361697 | A1 | 11/2019 | Hu et al. |
| 2020/0202246 | A1 * | 6/2020 | Lin ................... G06F 16/24568 |
| 2021/0136122 | A1 | 5/2021 | Crabtree et al. |
| 2021/0357277 | A1 | 11/2021 | Vityaz |
| 2022/0100554 | A1 | 3/2022 | Vityaz |
| 2022/0207086 | A1 | 6/2022 | Rao et al. |
| 2022/0343250 | A1 | 10/2022 | Tremblay et al. |
| 2024/0272968 | A1 | 8/2024 | Vityaz |

OTHER PUBLICATIONS

U.S. Non-Final Office Action dated Dec. 2, 2025 cited in U.S. Appl. No. 17/481,742, 28 pgs.

Lavana et al., "Executable Workflows: A Paradigm for Collaborative Design on the Internet", Proceedings of the 34th Annual Design Automation Conference, 1997, 6 pgs., http://www.cbl.ncsu.edu/demos.

U.S. Final Office Action dated Aug. 29, 2024 cited in U.S. Appl. No. 17/481,742, 31 pgs.

Gog et al., "Musketeer: all for one, one for all in data processing systems," Proceedings of the Tenth European Conference on Computer Systems, 2015, 16 pgs.

U.S. Non-Final Office Action dated Dec. 13, 2024 cited in U.S. Appl. No. 17/481,741, 27 pgs.

Liu et al., "Monitoring and Analyzing Big Traffic Data of a Large-Scale Cellular Network with Hadoop", IEEE Network, Jul./Aug. 2014, pp. 32-39.

U.S. Non-Final Office Action mailed Jan. 13, 2025 cited in U.S. Appl. No. 16/027,926, 19 pgs.

U.S. Final Office Action dated Jan. 22, 2019 cited in U.S. Appl. No. 15/268,802, 16 pgs.

U.S. Non-Final Office Action dated Mar. 19, 2020 cited in U.S. Appl. No. 16/252,075, 32 pgs.

U.S. Non-Final Office Action dated May 26, 2020 cited in U.S. Appl. No. 16/027,926, 22 pgs.

U.S. Final Office Action dated Jul. 20, 2020 cited in U.S. Appl. No. 16/072,926, 24 pgs.

U.S. Final Office Action dated Aug. 21, 2020 cited in U.S. Appl. No. 16/252,075, 36 pgs.

U.S. Non-Final Office Action dated Sep. 21, 2020 cited in U.S. Appl. No. 16/072,926, 21 pgs.

U.S. Final Office Action dated Jan. 19, 2021 cited in U.S. Appl. No. 16/072,926, 21 pgs.

James S. Albus, "An Intelligent Systems Architecture for Manufacturing," Proceedings of the International Conference on Intelligent Systems: A Semiotic Perspective, 1996, 8 pgs.

Widyawardana Adiprawita et al., Service Oriented Architecture in Robotic as a Platform for Cloud Robotic (Case Study: Human Gesture Based Teleoperation for Upper Part of Humanoid Robot), 2012 International Conference on Cloud Computing and Social Networking (ICCCSN), IEEE, 2012, 4 pgs.

Vitaly Alekseevich Egunov et al., "Robotic Complex Central Processing Node Performance Requirements Assessment," World Applied Sciences Journal (WASJ) 24.24, 2013, 6 pgs.

International Search Report and Written Opinion dated Dec. 15, 2022 cited in Application No. PCT/US22/38735, 9 pgs.

International Search Report and Written Opinion dated Dec. 19, 2022 cited in Application No. PCT/US22/38696, 7 pgs.

Horowitz et al., "Smart Memory Systems: Polymorphous Computing Architectures", Aug. 31, 2004, AFRL-VS-PS-TR-2004-1180, Retrieved at Technical Report, 47 pgs. (NOA dtd Nov. 15, 2023).

Colin de Verdière, "Computing element evolution towards Exascale and its impact on legacy simulation codes*", The European Physical Journal A 51: 163, 2015, 14 pgs. (NOA dtd Nov. 15, 2023).

U.S. Non-Final Office Action mailed Dec. 11, 2023 cited in U.S. Appl. No. 17/481,742, 47 pgs.

Hussein, "Requirements Models Transformation: From Buisiness Process Models to Object Statecharts—A Dissertation Submitted to the University of Manchester for the Degree of Master of Science in the Faculty of Engineering and Physical Sciences," 2014, 91 pgs.

U.S. Final Office Action dated Jul. 1, 2025 cited in U.S. Appl. No. 17/481,742, 21 pgs.

Lee et al., "Jadve: A Framework for Graph-Based Data Visualization Applications", 2997, 14 pgs.

* cited by examiner

SYSTEM AND METHOD FOR PROCESSING DATA OF ANY EXTERNAL SERVICES THROUGH API CONTROLLED UNIVERSAL COMPUTING ELEMENTS

RELATED APPLICATIONS

This application is a Continuation of U.S. application Ser. No. 17/388,341 filed on Jul. 29, 2021, which issues on Mar. 26, 2024 as U.S. Pat. No. 11,941,462, which is a Continuation-In-Part application under 35 U.S.C. § 120 of U.S. application Ser. No. 16/252,075 filed on Jan. 18, 2019, which issued on Feb. 1, 2022 as U.S. Pat. No. 11,237,835, which is a Continuation-In-Part application of U.S. application Ser. No. 15/268,802 filed on Sep. 19, 2016, which claims the benefit under 35 U.S.C. § 119(e) of U.S. Provisional Application No. 62/221,124 filed on Sep. 21, 2015.

Related U.S. application Ser. No. 16/252,075 filed on Jan. 18, 2019, which issued on Feb. 1, 2022 as U.S. Pat. No. 11,237,835 is also a Continuation-In-Part application under 35 U.S.C. § 120 of U.S. application Ser. No. 15/077,626 filed on Mar. 22, 2016, which claims the benefit under 35 U.S.C. § 119(e) of U.S. Provisional Application No. 62/137,079 filed on Mar. 23, 2015.

Related U.S. application Ser. No. 17/388,341 filed on Jul. 29, 2021, which issued on Mar. 26, 2024 as U.S. Pat. No. 11,941,462 further claims the benefit under 35 U.S.C. § 119(e) of U.S. Provisional Application No. 63/213,114 filed on Jun. 21, 2021.

Related U.S. application Ser. No. 17/388,341 filed on Jul. 29, 2021, which issued on Mar. 26, 2024 as U.S. Pat. No. 11,941,462 is also a Continuation-In-Part application under 35 U.S.C. § 120 of U.S. application Ser. No. 16/027,926 filed on Jul. 5, 2018, which is a Continuation-In-Part application of U.S. Ser. No. 15/268,802 filed on Sep. 19, 2016, which claims the benefit under 35 U.S.C. § 119(e) of U.S. Provisional Application No. 62/221,124 filed on Sep. 21, 2015.

Related U.S. application Ser. No. 16/027,926 filed on Jul. 5, 2018 is also a Continuation-In-Part application of U.S. application Ser. No. 15/077,626 filed on Mar. 22, 2016, which claims the benefit under 35 U.S.C. § 119(e) of U.S. Provisional Application No. 62/137,079 filed on Mar. 23, 2015.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure relates to computer-implemented systems and methods for multi-system connectivity and automation. More specifically, the present disclosure relates to multi-system connectivity and automation via collections of one or more universal computing elements, each of which may comprise an object queue, one or more counters, and a function operating on parameters of objects in the object queue.

BACKGROUND

In many ways, existing software and business process development paradigms can be rigid and siloed, burdened by inertia, slow to provide actionable business intelligence, difficult to scale, and difficult for non-coders to interact with.

Traditionally, many such systems have been developed without much consideration of how to combine them with each other, especially between different vendors (both hardware and software). Many of the configuration values that are parameters of business processes are hardcoded, making changes slow and expensive. The inertia of a heavy, slow-to-change, existing codebase can siphon information technology budgets away from innovation. In addition, many existing systems are batch-based and their response is determined by the batch frequency, not by the fluid, breathing reality of realtime data. Many existing systems also struggle with scalability and concurrency.

Further, some software development paradigms allow for powerful, flexible algorithm development, and some allow for no-code/low-code approachability. It may be advantageous for a system to provide both. Indeed, systems that may variously address the above issues, and others, may provide advantages over the traditional approaches.

In view of at least the above shortcomings, a need exists for systems and methods for multi-system connectivity and automation via universal computing elements.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Systems and methods for multi-system connectivity and automation via universal computing elements (UCEs) may be provided. A UCE consistent with the embodiments of the present disclosure may be operative with various methods, systems, and computer-readable media (collectively referred to herein as the "platform" or the "disclosed platform").

The platform may comprise one or more objects, each of which may be characterized by its parameters. The platform may comprise one or more universal computing elements (UCEs), each of which may comprise a queue for objects, one or more counters related to objects in the queue, and a function operating on object parameters and/or counters.

UCEs may operate in a manner analogous to state machines. Each object in the queue of a UCE may be conceptualized as being in a particular state at any particular time. Such a state may comprise the object's current parameters and their values. Such parameters may include an identifier for the UCE in which the object is queued. A UCE itself may also be conceptualized as being in a particular state at any particular time. Such a state may comprise the object constituents of its queue and the current values of counters related to objects in the queue. A UCE's function may transition objects to new states.

By way of non-limiting example, a function may change the state of an object by adding, modifying, or removing a parameter of that object. By way of another non-limiting example, a function of a first UCE may change the state of an object so that it may "flow" or "proceed" from the first UCE to a second "interconnected" UCE by changing a parameter of that object from identifying the first UCE to identifying the second UCE. Both of the above example state changes may be mutually consistent with each other and, indeed, may in some embodiments be engendered by the operation of a single UCE's function.

UCEs (also sometimes referred to as "nodes") may be connected in myriad ways to form processes, which may be thought of as collections of interconnected UCEs. In some embodiments, the connectivity of UCEs may be simple and linear. In one example, objects may proceed from a starting node through one or more subsequent nodes to an end node, functions operating on objects each step of the way. In further embodiments, the connectivity of UCEs (and of processes), need not be simple nor linear. The interconnections between UCEs (and between processes) may be complex, including loops, branches, nesting, and multiple end points.

Objects (also sometimes referred to as "tasks"), characterized by parameters (for example, name:value pairs), may flow into a node's queue from a variety of sources. The variety of sources may include, but not be limited to, for example, other processes, application programming interfaces (APIs) and various data sources (databases, etc.), and human input.

In some aspects, the techniques described herein relate to a non-transitory computer-readable medium including instructions that, when read by a processor configured to host a plurality of universal computing elements (UCEs), cause the processor to perform operations including receiving, by a UCE associated with a process, from at least one application programming interface, a second UCE associated with another process of a first object. The first UCE transmits information including at least one parameter of the first object to the second UCE. The second UCE creates a second object including the at least one parameter of the first object; receiving, by the second UCE, the second object, and transmits a request to an application programming interface (API). The second UCE sets at least one parameter of the second object based on at least one of: a successful response from the API, an error response from the API, or a lack of response from the API. A third UCE of a second process receives the second object and transmits information including the at least one parameter of the second object to a second UCE of the first process. The second UCE of the first process receives the first object and sets at least one parameter of the first object based on the information including the at least one parameter of the second object.

In some aspects, the techniques described herein relate to a method for processing data of external services, the method including receiving, by a first universal computing element (UCE) associated with a process, from at least one application programming interface, a second UCE associated with another process of a first object. The first UCE transmits information including at least one parameter of the first object to the second UCE. The second UCE creates a second object including the at least one parameter of the first object. The second UCE receives the second object and transmits a request to an application programming interface (API). The second UCE sets at least one parameter of the second object based on at least one of: a successful response from the API, an error response from the API, or a lack of response from the API. A third UCE of a second process receives the second object and transmits information including the at least one parameter of the second object to a second UCE of the first process. The second UCE of the first process receives the first object, and sets at least one parameter of the first object based on the information, including the at least one parameter of the second object.

In some aspects, the techniques described herein relate to a system including: a processor configured to host a plurality of universal computing elements (UCEs), and a memory on which are stored machine-readable instructions that, when executed by the processor, cause the processor to perform operations including receiving, by a first universal computing element (UCE) associated with a process, from at least one application programming interface, a second UCE associated with another process of a first object. The first UCE transmits information including at least one parameter of the first object to the second UCE. The second UCE creates a second object including the at least one parameter of the first object. The second UCE receives the second object, transmits a request to an application programming interface (API), and sets at least one parameter of the second object based on at least one of: a successful response from the API, an error response from the API, or a lack of response from the API. A third UCE of a second process receives the second object and transmits information including the at least one parameter of the second object to a second UCE of the first process. The second UCE of the first process receives the first object; and sets at least one parameter of the first object based on the information, including the at least one parameter of the second object.

Consistent with embodiments disclosed herein, a node may comprise at least one counter. A node's counters may be used to, by way of non-limited example, keep track of data about the objects currently in that node's queue. A non-limiting example of data related to which an object may keep a counter is the number of objects in the queue. Another such example may be the timestamp of each object's entry into the queue. Another such example may be how many of the objects have parameters that meet particular criteria.

A function (which, in certain contexts may be disclosed or utilized as at least one "rule"), consistent with the embodiments herein may be associated with a node. The function may be, for example, but is not limited to, a conditional, API call, code snippet, or call to another process. Functions may be configured to operate on (parameters of) objects that enter a UCE's queue or on the UCE's counters. In some embodiments, functions may serve to alter parameters of objects, as may be the case when an API is called and returns pertinent data to add to the object about which it was called.

The platform may provide, by way of non-limited example, an API interface, analytics, dashboarding, and data visualization functionality. The platform may provide various measures of, and interfaces to, processes in realtime.

One objective of the disclosed platform may be to provide a UCE comprising a queue of objects, object counters, and a function operating on at least one of the objects.

Another objective of the disclosed platform may be to provide for a plurality of connected UCEs capable of assembling algorithms of arbitrary complexity.

Another objective of the disclosed platform may be to provide a Turing complete computational system.

Another objective of the disclosed platform may be to provide nestable, independent, state machines.

Another objective of the disclosed platform may be to provide multi-system connectivity and automation of workflows via an interconnected plurality of UCEs.

Another objective of the disclosed platform may be to connect with a plurality of services and data sources via application programming interface (API).

Another objective of the disclosed platform may be to provide UCEs having particularized functionalities such as conditionals, API calls, mathematical expressions, variable get/set, and arbitrary code.

Another objective of the disclosed platform may be to provide a cloud-based platform that can be managed via anonymized/non-identifying data.

Another objective of the disclosed platform may be to scalably accommodate high request per second workloads.

Another objective of the disclosed platform may be to provide for no-code/low-code functionality that may enhance the efficiency, speed, or division of labor in software and process development.

Another objective of the disclosed platform may be to provide rapid prototyping by building complex systems from UCEs.

Another objective of the disclosed platform may be to provide multi-purpose cloud platform for development, maintenance, management, execution, monitoring and optimization of software for automatic or automated business processes.

Another objective of the disclosed platform may be to provide process versioning for the platform's processes.

Another objective of the disclosed platform may be to provide for the possibility of storing data within the platform.

Another objective of the disclosed platform may be to provide a user interface to the platform that permits "drag-and-drop" creation, selection, interconnection, and modification of UCEs.

Another objective of the disclosed platform may be to provide a user interface to the platform that provides pertinent information and inputs upon the selection of a UCE.

Another objective of the disclosed platform may be to provide error handling for API calls and other actions performed by the platform.

Another objective of the disclosed platform may be to describe changes of the relative states of data within the platform.

Another objective of the disclosed platform may be to utilize state diagrams in the manner of a database, such that the logic of an object's transition between different states described, and further that state transitions may trigger the launch of processes.

Another objective of the disclosed platform may be to permit increases in efficiency by shifting a process into an in-memory configuration.

Another objective of the disclosed platform may be to enable analytics, dashboarding, and data visualization functionality for UCEs.

The disclosed platform may provide technical advantages over conventional solutions. One such advantage may be the scalability of UCE-based processes to possibly handle thousands, tens of thousands, or more of concurrent tasks.

Another such advantage may be the breadth of the platform's trackable data and speed of access of analytics, dashboarding, and data visualization to the same.

Another such advantage may be the ability for a queue to store an arbitrary number of objects.

Another such advantage may be the breadth of functionality available to UCE functions.

Another such advantage may be the possibility for simultaneous, multifarious sourcing of objects.

Another such advantage may be the possibility of accepting and handling objects with heterogenous data structures.

Another such advantage may be the limitless capacity for sequentializing objects in queues via custom counters.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings and their brief descriptions below may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1A:
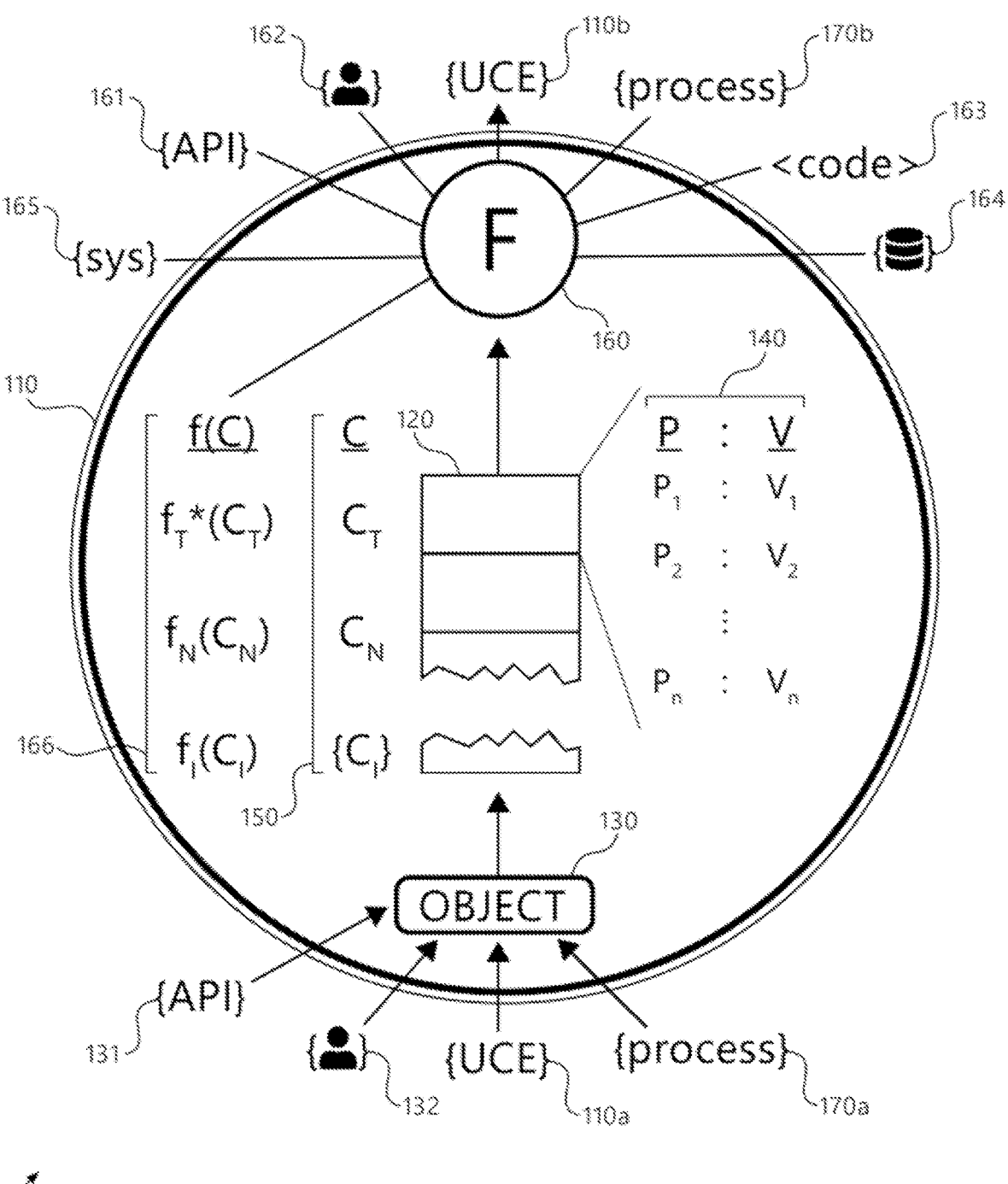
FIG. 1A illustrates a conceptual diagram of a universal computing element in accordance with various embodiments of the present disclosure.
Figure 1B:
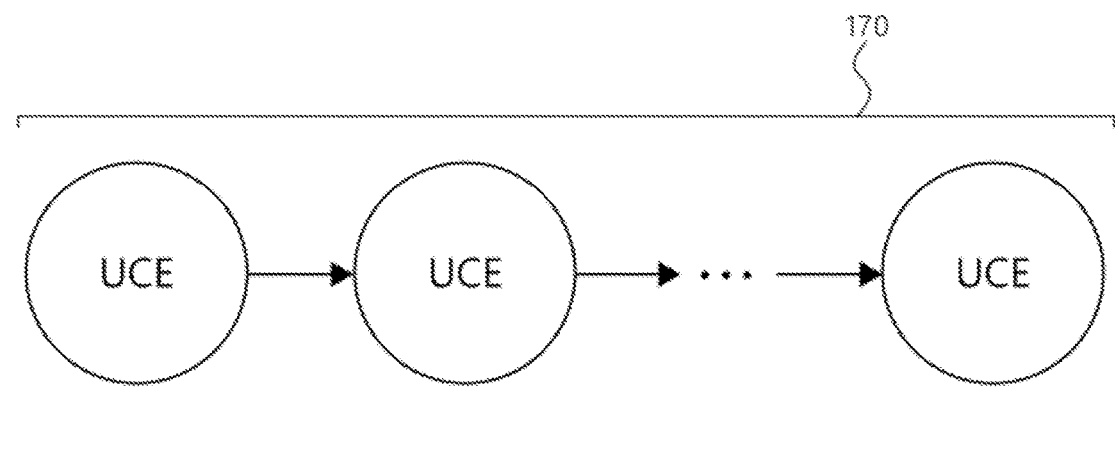
FIG. 1B illustrates a conceptual diagram of a process comprising universal computing elements in accordance with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, itis to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of stages of various processes or methods that are described herein are illustrative and not restrictive. Accordingly, it should be understood that, although stages of various processes or methods may be shown and described as being in a sequence or temporal order, the stages of any such processes or methods are not limited to being carried out in any particular sequence or order, absent an indication otherwise. Indeed, the stages in such processes or methods generally may be carried out in various different sequences and orders while still falling within the scope of the present disclosure. Accordingly, it is intended that the scope of patent protection is to be defined by the issued claim(s) rather than the description set forth herein.

Embodiments of the present disclosure may provide a hardware and software platform operative by a set of methods and computer-readable media comprising instructions configured to operate computing elements in accordance with the methods. The present disclosure depicts and/or describes at least one example method of a plurality of methods that may be performed by at least one of the aforementioned computing elements. Various hardware components may be used at the various stages of operations disclosed with reference to each computing element.

For example, although methods may be described to be performed by a single computing device, it should be understood that, in some embodiments, different operations may be performed by different networked elements in operative communication with the computing device. For example, at least one computing device may be employed in the performance of some or all of the stages disclosed with regard to the methods. Similarly, an apparatus may be employed in the performance of some or all of the stages of the methods. As such, the apparatus may comprise at least those architectural components as found in the computing device.

Furthermore, although the stages of the example method(s) disclosed herein are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "stage for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context such as authentication workflows, communication workflows, chat and chatbot workflows, finance and banking workflows, and logistics workflows, embodiments of the present disclosure are not limited to use only in this context. Other examples may include customer relationship management workflows, ecommerce workflows, robotics workflows, rideshare and transportation workflows, software development workflows, etc.

I. Overview

Consistent with embodiments of the present disclosure, systems, methods, and computer-readable media for multi-system connectivity and automation via universal computing elements—platform 100—are provided. Various embodiments of platform 100 are described herein. Components of platform 100 as presented in the following disclosure may be integrated, used independently, in conjunction with, used separately, or in connection with other embodiments they are not shown or described as functioning with. Any aspects of one embodiment may or may not be used interchangeably with other elements and aspects of a platform 100 as presented in the present disclosure.

Some or all of the following components may be present in embodiments of the present disclosure. The below description is in no way intended to limit the components that may be present in addition or in alternative to the listed components, nor to require that any particular component be included in a form described below.

a. Platform 100

Platform 100 may, in various aspects and embodiments, be conceptualized as a collection of one or more interconnected universal computing elements (or "UCEs") 110. An example conceptual diagram of a UCE (or "node") 110 is depicted in FIG. 1A. Consistent with the depiction in FIG. 1A, UCEs 110 may comprise a queue 120 for objects (or "tasks") 130. Objects 130 may be characterized by parameters 140 (e.g. name:value pairs). Counters 150 may store data about queue 120 or objects 130. A function (or "rule") 160 may operate on parameters 140 of the UCE's 110 objects 130 or on counters 150 of the UCE 110.

UCEs 110 may operate in a manner analogous to state machines. Each object 130 in the queue 120 of a UCE 110 may be conceptualized as being in a particular state at any particular time. Such a state may comprise the object's 130 current parameters 140 and their values. Such parameters 140 may include an identifier for the UCE 110 in which the object is queued. A UCE 110 itself may also be conceptualized as being in a particular state at any particular time. Such a state may comprise the object 130 constituents of its queue 120 and the current values of counters 150 related to objects 130 in the queue 120. A UCE's 110 function 160 may transition objects 130 to new states. By way of non-limiting example, a function 160 may change the state of an object 130 by adding, modifying, or removing a parameter 140 of that object 130.

In various embodiments, a UCE 110 may form an outbound connection with another UCE 110 or with itself. By way of another non-limiting example, a function 160 of a first UCE 110 may change the state of an object 130 so that it may "flow", "proceed", or "be released" from the first UCE 110 to a second "interconnected" UCE 110 by changing a parameter 140 of that object 130 from identifying the first UCE 110 to identifying the second UCE 110. The second UCE 110 may be said to "accept" the object 130. By way of another non-limiting example, an object 130 may remain in a UCE's 110 queue 120 until acted upon by the UCE's 110 function 160. By way of another non-limiting example, an object 130 may remain in the queue 120 an "end" node 110 indefinitely.

Figure 1C:
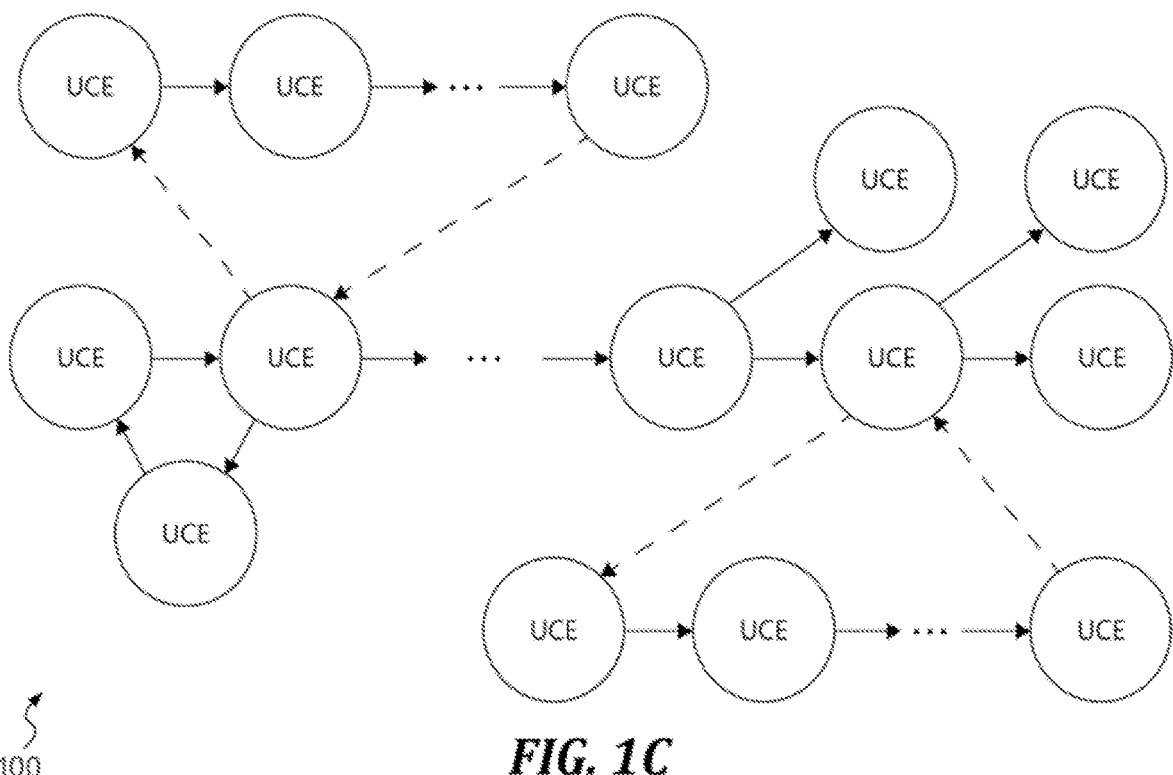
FIG. 1C illustrates a conceptual diagram of a process comprising universal computing elements in accordance with various embodiments of the present disclosure.

UCEs 110 may be combined together into collections of UCEs 110 that form a process 170. In a process 170, objects 130 may be routed among UCEs 110, passing through their respective queues 120, wherein their parameters 140 may be operated upon and modified by the UCEs' 110 respective functions 160. The path may be simple, as depicted for example in FIG. 113, but need not be. Processes 170 may be arbitrarily complex, including include loops, branches, nesting, multiple endpoints, etc., as depicted for example in FIG. 1C (which also depicts calls, represented by dotted lines, from UCEs 110 to other processes 170).

Figure 2A:
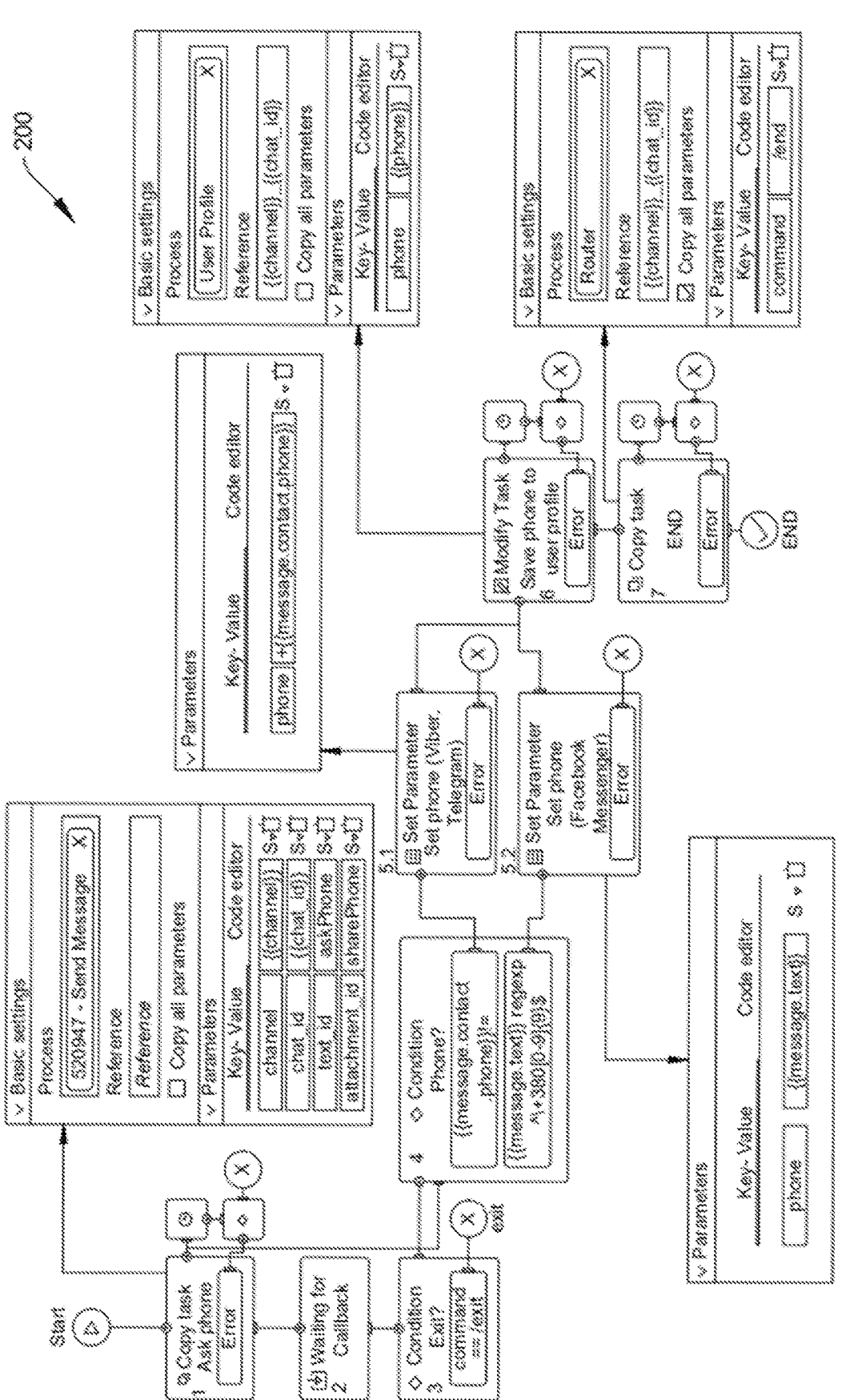
FIG. 2A illustrates an example interface to the disclosed platform showing an example implementation in accordance with various embodiments of the present disclosure.
Figure 2B:
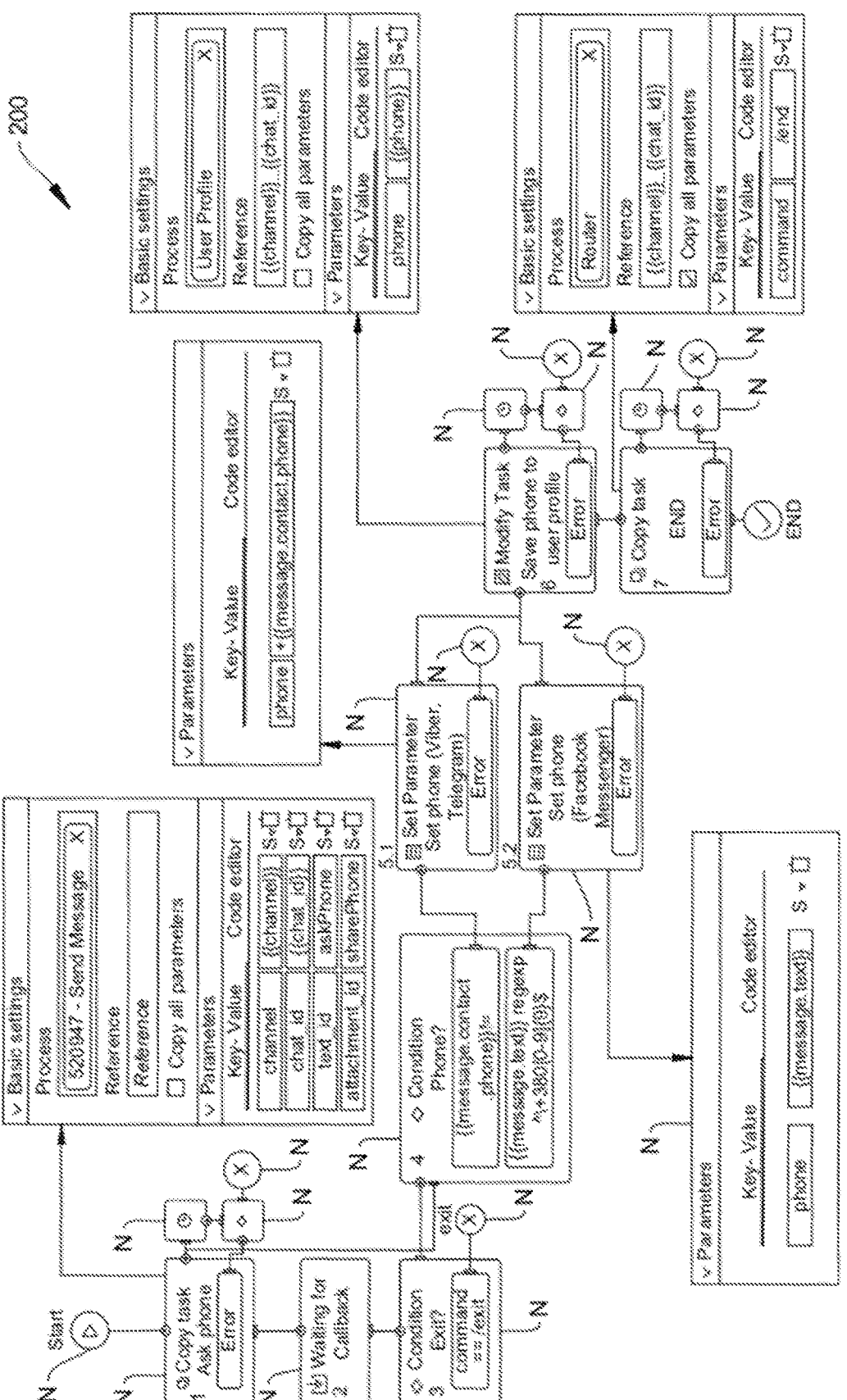
FIG. 2B illustrates an example interface to the disclosed platform showing an example implementation in accordance with various embodiments of the present disclosure.

FIGS. 2A-B depict an example interface to platform 100 showing example implementation 200. In this example implementation 200, UCE nodes 110 (labeled for clarity in FIG. 2B with an "N") are collected into an example process 170 for authenticating a user via their phone number. This example implementation 200 depicts nodes 110 subspecialized (as discussed further infra) and variously connected. Also depicted are various nodes' 110 pertinent parameters 140 (see boxes called out by arrows). This example implementation 200 is explored in greater detail infra following a brief overview of some features platform 100 may comprise, as well as some examples involving the same.

i. Brief Overview of Features Platform 100 May Comprise

By way of non-limiting example, a queue 120 may be generally conceptualized, in various embodiments, as representing a collection of tasks 130 to or about which a node 110 is to do something (i.e. via function 160). Objects 130 may enter a UCE's 110 queue 120 from a variety of sources, which may include the results of an API call 131 (which may be generalized as encompassing a broad array of data sources and external processes), human input 132, another UCE 110a, or another process 170a.

By way of non-limiting example, objects 130 may be generally conceptualized, in various embodiments, as representing a discrete conceptual unit about which something is to be done. Objects 130 may be generally conceptualized this way both in the sense of an individual UCE 110 "doing" something, in its course of operation, to or about object 130, and in the more general sense of object 130 existing in process 170 as a task 130 to be purposefully acted upon. Some examples may include as a caller to be routed to an operator, a loan borrower to be checked for creditworthiness, a chat participant to be authenticated, etc. More abstract examples may include a currency exchange rate to be polled, location-specific weather forecast to be queried, an HTTP connection to be kept alive, etc.

By way of non-limiting example, parameters 140 may be generally conceptualized, in various embodiments, as characterizing the current state of an object 130, such as, for example, a caller's initial call timestamp, a loan borrower's tax ID, a chat participant's chat instance ID, an exchange rate request's from and to currencies, a weather forecast request's geographic information, a Hypertext Transfer Protocol (HTTP) connection's Uniform Resource Locator (URL), etc.

Still consistent with embodiments of the present disclosure, parameters 140 may be added or modified by UCEs 110. For example while a caller's initial call timestamp may stay the same throughout a process 170, a parameter 140 signifying the number of times the caller has been transferred may increment. An object 130 representing a chat participant may be updated with the parameter 140 of the participant's response to a request for their phone number to authenticate them. An object 130 representing a weather forecast request may be updated with the parameter 140 of current temperature, returned from a call to a weather API. In another non-limiting example, as an object 130 proceeds through a process 170, parameters 140 may be altered by a first UCE 110. If the object 130 passes into the queue 120 of a subsequent UCE 110, the subsequent UCE 110 may "see" the parameters 140 of the object 130 as altered by the first UCE 110.

By way of non-limiting example, counters 150 may be generally conceptualized, in various embodiments, as counting or ordering objects 130 with respect to queue 120, such as the number of objects 130 in queue 120, the timestamp of entry of an object 130 into the queue 120.

Byway of non-limiting example, a function 160 may be generally conceptualized, in various embodiments, as the aspect of a UCE 110 that is doing the "doing" that UCE 110 does to or in association with objects 130 that enter its queue 120. Functions 160 may comprise operations such as mathematical expressions, conditionals, getting and setting variables, running code (e.g., Javascript, Java, Erlang, etc.).

In yet further embodiments, functions 160 may be configured for establishing connections to external systems (e.g. API calls, database connections, code versioning repositories), calling or modifying other processes 170, asking for input from a user, etc. A function 160 may, as part of its operation, alter one or more parameters 140 of an object 130 to which it is applied.

In various embodiments, upon the execution of a first UCE's 110 function 160, an object 130 may pass to a subsequent one of the plurality of UCEs 110*b* (which may include a loopback to the same UCE 110). Subsequent UCE 110*b* may apply a function 160 to the object 130. Additionally or alternatively, subsequent UCE 110*b* may be an end state (i.e. an end node 110). In various embodiments, there may be at least one interconnection between each UCE 110 and at least one other UCE 110, each interconnection comprising an outbound UCE 110 and an interconnection function of the outbound UCE 110 identifying one of the plurality of UCEs 110*b*.

By way of non-limiting example, a first UCE's 110 function 160 may comprise an interconnection that may identify one of the plurality of UCEs 110*b* that may comprise a process 170. The interconnection may be configured to set one of the one or more parameters 140 of a queued object 130 to which the function 160 is applied to the UCE 110*b* identified by the interconnection. In this example, setting a "node identifier" parameter 140 to UCE 110*b* may precipitate the release of the object 130 from the queue 120 of the first UCE 110 to the queue 120 of the subsequent, identified UCE 110*b*.

In some embodiments, an object 130 may pass to one of potentially many UCEs 110*b*, depending on the one to arbitrarily many exit states possible for a function 160. This can be as simple as shunting off error-state objects 130 to an error handling node 110, or as complex as logic/code dictates.

For example, function 160 may set a parameter 140 of objects 130 that pass through its queue 120. As another example, function 160 may get an object 130 from the queue 120 of a UCE 110 from another process 170. As another example, function 160 may apply a conditional to a parameter 140 of each object 130 that enters the queue 120, such as whether its value exceeds a threshold, or whether the returned text string matches one of various string values. The outcome of a conditional function 160 may be used to direct the flow of outgoing objects 130 to interconnected nodes 110. As an example, a conditional may have a plurality of outcomes, each outcome providing an outbound interconnection to a node 110.

In a non-limiting, general example of the operation of a UCE 110, queue 120 may take in objects 130 representing prospective loan borrowers, via manual data entry 132, the objects 130 having parameters 140 such as name and tax ID. UCE 110 may apply the function 160 of performing an API call 161 to a credit reporting service, which may return data concerning each object's 130 (borrower's) creditworthiness. An implementation of platform 100 consistent with this example and comprising a user interface may enable a user to configure the API call UCE 110 in a manner such as that depicted in FIG. 4.

In a non-limiting, general example of the operation a process 170, a first UCE 110 may take in objects 130. The objects' 130 parameters 140 may comprise user data and message text. The first UCE 110 may pass objects 130 to a second UCE 110 that may query a database for a phone number corresponding to the objects 130 (users). The second UCE may pass objects 130 (now including phone number as a parameter 140) to a third UCE 110 that may call an API for an SMS messaging service, instructing the SMS messaging service to transmit the textual data to the user's phone number. An implementation of platform 100 consistent with this example and comprising a user interface may enable a user to configure these UCE 110 in a manner such as that depicted in FIGS. 2A-B, 4, and 7.

In this example, there may be UCE 110 branches performing various functionality—for instance, handling error states of the various steps along the path. The second UCE 110 may have an error handling branch to a node 110 that handles, for example, what happens if the database query takes too long to respond, finds the user but no phone number, or fails to find a corresponding user at all. The third UCE 110 may have an error handling branch to a node 110 that handles, for example, what happens if the API takes too long to respond, or returns an error due to an out-of-country or incorrectly formatted number.

Platform 100 may comprise a user interface for creating, managing, and interacting with UCEs 110 and processes 170. Some features of a user interface, as may be present in various embodiments, may follow. One such feature may be foldered organization and management of processes 170. Another such feature may be "drag-and-drop" (i.e. pointing device navigable) creation, selection (as among nodes 110 differentiated by function 160), interconnection, and modification of UCEs 110. Another such feature may be the display of process or state "maps" that visualize relationships between nodes 110. In various embodiments, a visual mapping of a process 170 may comprise displaying each of the process' 170 UCEs 110 and each interconnection among the process' 170 UCEs 110.

Another such feature may be providing templates that comprise pre-set and preconnected collections of UCEs 110. In various embodiments, such templates may be presented to a user of an example interface to platform 100 in the form of a template library. Another such feature may be providing model API call nodes 110 preconfigured for connecting with particular APIs. Another such feature may be the display of pertinent data and inputs upon indicating (i.e. selecting) a particular element in a process 170 such as a node 110 or connection.

In an example, a user interface of platform 100 might display, upon selection of a particular node 110, pertinent parameters 140, fields for entry of pertinent data (e.g. a language selector and code or database query input box, URL for an API call). The user interface may also display other pertinent options for the functioning of the node 110, such as whether to send system information, whether and what to send with respect to header information, cryptographic signature, limiting the time of a task 130 in the node 110, etc.

In some embodiments, a user interface of platform 100 may automatically create and interconnect various nodes 110 upon the user's creation of a node 110 of a particular type. For example, upon creating a UCE 110 of the type "API call", platform 100 may automatically create an error handling loop comprising a conditional node 110 which may operate on the type of error (e.g. long wait for answer, failed to add parameters 140 to query, invalid format provided, empty URL, response is too large, etc.). The conditional node 110 may, by its logic, pass objects 130 with some errors to a delay node 110 (looped back to the API call node 110 to retry after a delay). This may be the case for errors that are deemed "recoverable" (e.g. long wait for answer). The conditional node 110 may, by its logic, pass other errors to a terminal exit node 110 signifying the process 170 was terminated in an error state. This may the case for errors that are deemed "non-recoverable" (e.g. empty URL). An implementation of platform 100 consistent with this example and comprising a user interface may enable a user to configure an API call UCE 110 and a conditional UCE 110 in a manner such as that depicted in FIGS. 4 and 6.

Platform 100 may comprise analytics, dashboarding, and data visualization functionality. In various embodiments, platform 100 may provide visibility into the current status of running processes 170. For example, platform 100 may provide metrics that may be derived from counters 150 or object 130 parameters 140. Examples of metrics might include how many callers are currently in a call queue waiting for an operator to speak with them, how many loan requests have been routed to various risk tier "buckets" (e.g. end nodes 110 to which objects 130 are routed), or the 24 hour trend of currency exchange rates polled at regular intervals.

In various embodiments of platform 100, counters 150 as well as the states (current parameters 140) of objects 130, of any UCE 110, may be utilized for current and historical analytics, dashboards, data visualizations, graphical representations, etc. Such status visibility may, in some embodiments, be available in "realtime". In some embodiments, "realtime" may mean there is little delay between platform 100 reaching a state and the availability of that current state to analytics/dashboarding.

Platform 100 may itself comprise one or more APIs for interacting with various components of platform 100. Non-limiting examples of API interactions with platform 100 follow. An example API to platform 100 may enable the creating, duplicating, and destroying of objects 130 and the moving objects 130 between nodes 110. An example API to platform 100 may enable altering parameters 140. An example API to platform 100 may enable altering counters 150. An example API to platform 100 may enable creating, modifying, and deleting processes 170 (including various aspects of processes' 170 UCEs 110). An example API to platform 100 may enable creating, modifying, deleting, and interacting with analytics, dashboards, and data visualizations. An example API to platform 100 may enable the performing of administrative functions (e.g. changing user permissions).

Figure 10:
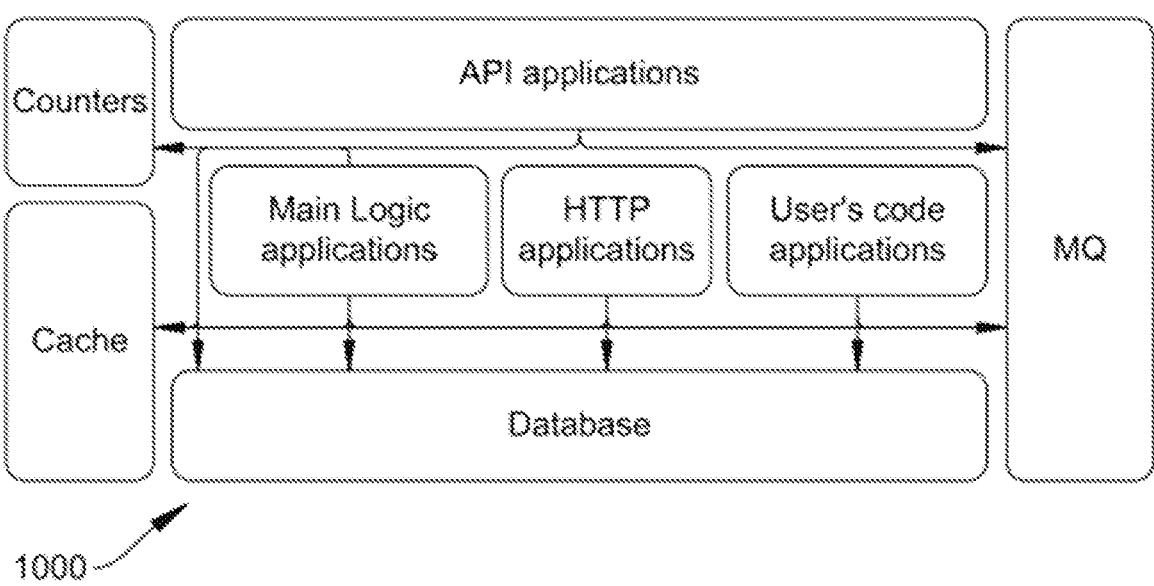
FIG. 10 illustrates a block diagram of the architecture of an example implementation of the disclosed platform in accordance with various embodiments of the present disclosure.
Figure 11:
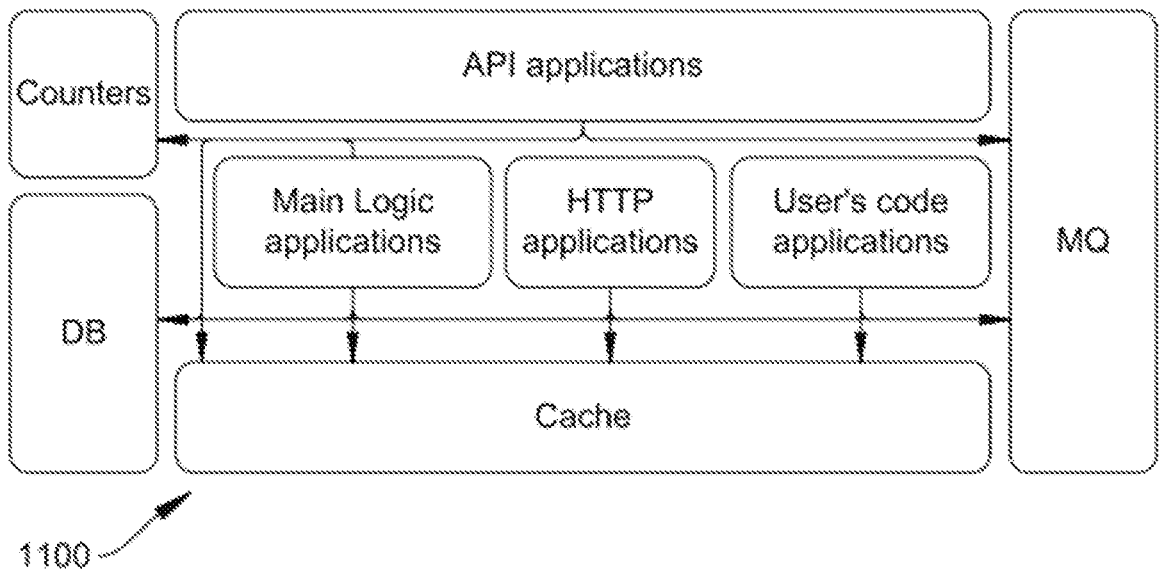
FIG. 11 illustrates a block diagram of the architecture of an example implementation of the disclosed platform in accordance with various embodiments of the present disclosure.

Platform 100 and elements thereof (e.g., a process 170), may be implemented in a storage medium such as a database, or in memory, as is discussed further infra Section III (see FIGS. 10-11). UCEs 110 and processes 170 may be combined to construct algorithms of arbitrary complexity; in various embodiments, platform 100 may be implemented as a Turing complete computational system, as is discussed further infra Section III (see FIGS. 13A-B).

ii. Example Implementation 200

An example implementation 200 consistent with that depicted in FIGS. 2A-B includes a plurality of nodes 110 interconnected to form a process 170 for authenticating users via their phone numbers. This example may begin with a "Start" node 110 where objects 130 (representing users to be authenticated) may enter process 170. An object 130 may proceed to a "Copy task" node 110 (labeled "1"), where it may be copied, along with relevant parameters 140, to another process 170. In this example, the object 130 may be copied to a "Send Message" process 170 for sending an authentication SMS message (e.g., a 6-digit code) to the user, so that they may confirm their receipt of the message and thus their possession of the relevant authenticating device.

If the communication with the "Send Message" process 170 results in an error, an object 130 may proceed into a special error handling loop that may delay and retry or exit altogether in an error state. This may reflect a specific instance of how platform 100 may, in some embodiments, enable error handling, in that nodes 110 whose functions 160 that may result in error states may be provided with "conditional-like" interconnection points that may permit outflow of objects 130 based on the occurrence of an error state.

Otherwise, objects 130 may proceed to a "Waiting for Callback" node 110 (labeled "2") that awaits the response of the user to the authentication message generated by the "Send Message" process 170. Any user response may proceed to the "Condition" node 110 (labeled "3") that may provide an opportunity for an exit command to be issued by the user. Such input may lead to a terminal "exit" node 110, canceling the process 170. Otherwise, an object 130 may proceed to another "Condition" node 110 (labeled "4") which may validate the user's response. If the user entered the wrong value, object 130 may return to the "Copy task" node 110 (labeled "1"). Otherwise, upon success, object 130 may proceed to one of two "Set Parameter" nodes 110 (labeled "5.1" and "5.2") depending how the platform that served as the source of the object 130 provided phone contact details. If for some reason the setting of the "phone" parameter 140 would result in an error state, each of the "Set Parameter" nodes 110 has a terminal exit node 110.

An object 130 may then proceed to a "Modify Task" node 110 (labeled "6"). This node 110 may set the "phone" parameter 140 of a user data object 130 in a "User Profile" process 170. There may be an error handling loop to deal with the possibility that communication with the "User Profile" process 170 may result in an error. An object 130 may then proceed to a "Copy task" node 110 (labeled "7"). This node 110 may copy the object 130 (user), now authenticated, to another process 170. In this example, this may be a "Router" process 170 from which this authentication process 170 may have been initially called. Again, there may be an error handling loop attached to this node 110 (for example, if the other process 170 is not active) but if no error is encountered, an object 130 may then proceed to a successful "END" node 110.

It may be noted that, in various embodiments, each of the nodes 110 in a process 170 such as that depicted in example implementation 200 may be trackable in a dashboard or otherwise available as a source of analytics data. For example, a dashboard may track a counter 150 of how many users issued an exit command before reaching a successful conclusion (objects 130 that reach the exit node 110 of the "Condition" node 110 labeled "3"), how many users there are currently waiting for a response to the "Send Message" process 170 (objects 130 in the queue 120 of the "Waiting for Callback" node 110 labeled "2"), how many users successfully authenticated (objects 130 that reach the "END" exit node 110 of the "Copy task" node 110 labeled "7"), etc.

Further discussion of features platform 100 may comprise follows.

b. Universal Computing Element 110 and Process 170

Platform 100 may comprise a universal computing element 110. A UCE 110 may comprise a queue 120 of objects 130 characterized by parameters 140, counters 150 that may store data about queue 120 or objects 130, and a function 160 that may operate on parameters 140 or counters 150.

In some embodiments, UCEs 110, as presented to users in an interface to platform 100, may be specialized so as to, for example, simplify and guide the user experience. Such specialization may, for instance, comprise specialized function 160 functionality that presents particular "types" of nodes 110 (discussed further infra) such as conditional nodes 110, API call nodes 110, delay nodes 110, wait for response nodes 110, etc., each of which may be a subset of the generalized power of function 160 to operate upon parameters 140 and counters 150.

Inputs of objects 130 to a process 170 (and generally to a UCE 110) may come from multiple sources. For example, 4 different APIs 131 and a manual data entry source 132 may all feed the start node 110 of a single process 170. In various embodiments, one or multiple processes 170 may have a node 110 whose function 170b calls on a (sub-) process 170 to perform some subset of processing. As an example, such a "calling" process 170 may act as a source 170a of (i.e. "passing in" of) objects 130 to the (sub-) process 170.

UCEs 110 may have between zero (i.e. an end node 110) and arbitrarily many outbound paths to other UCEs 110. Multiple UCEs 110 may have outbound interconnections to a single inbound (i.e. receiving) UCE 110. UCEs 110 can be connected linearly or in complex looping, branching, etc. configurations. Platform 100 may comprise protections against infinite loops, for example a rule that stops processing if a task 130 would be cycled over 50 times through a loop of nodes 110.

In various embodiments, one or more end nodes 110 may serve as the terminal points of a process 170. By way of non-limiting example, an end node 110 may have zero outbound interconnections to other UCEs 110. Consistent with such an example, objects 130 that reach (the queue 120 of) an end node 110 may not proceed to any other nodes 110, but rather may be "collected" in the end node's 110 queue 120. In some embodiments not inconsistent with such an example, an object 130 reaching an end node 110 may trigger an action by the platform 100, such as issuing an alert, creating a new object 130, or invoking another process 170.

In some embodiments, one or more counters 150 may track objects 130 that reach an end node 110. In an example, an end node 110 may have a counter 150 that tracks the number of objects 130 in that end node's 110 queue 120. In another example, an end node 110 may have a counter 150 that tracks the time of entry of each object 130 to that end node's 110 queue 120.

Processes 170 may have the ability (e.g., through a user interface selection) to be in different states of activity. Different states of activity may comprise, but not be limited to, an active state (i.e., actively running and processing objects 130), a paused (i.e. not running) state, or debug state (which may permit additional development activities in the running of processes 170 such as setting breakpoints). A process 170 in a paused state may cause an error state in another process 170 that calls it or otherwise depends on it being in active operation. This may make it opportune for some embodiments to comprise a user interface to platform 100 that automatically creates error handling loops for functions 160 like calling another process 170.

c. Queue 120, Object 130, and Parameters 140

Platform 100 may comprise a queue 120 of one or more objects 130. An object 130 may comprise data in the form of parameters 140 that characterize object 130. Object 130 may be devoid of parameters 140 (i.e., a pure "pulse" to be run through the process 170). A queue 120 may store an arbitrary number of objects 130.

While objects 130 in a queue 120 may correspond to ordering information (e.g., a timestamp counter 150 sequentializing the entry of objects 130 into the queue 120), a queue 120 need not be conceptualized as a sequential first in first out (FIFO) or last in first out (LIFO) data structure. Objects 130 are susceptible to infinitely many categorizing criteria based on their parameters 140 and various counters 150. This categorizing principle may be used to distribute objects 130 amongst UCEs 110 (recall that an object can pass to one of potentially many UCEs 110b) in ways that do not depend on the time sequence of entry of the objects 130 into the queue 120.

In some embodiments, some parameters 140 may be "global" in the sense that these parameters 140 are available as to all objects 130 at all times. Such globally available parameters 140 may include a timestamp of the object's 130 creation (i.e., when it first became an object in this process 170), the last time the object 130 changed state (i.e., change in a parameter 140), various static and dynamic timer values, the ID of the current node 110 where the object 130 is queued, and the ID of the object 130 itself.

Parameters 140 may comprise any type of data, from strings, numbers, and booleans, to geographic coordinates, JavaScript Object Notation (JSON) data, images, binary data, pointers, etc. Not all objects 130 in a process 170 or in a queue 120 are required to have the same data structure (i.e. set of parameters 140 and data types for their values). Since inputs of objects 130 to a process 170 or UCE 110 may come from different sources, various sources may name, type, structure, include, or omit parameters 140 in their own idiosyncratic ways. For example, while one bank's API may return a field (parameter 140) titled "blacklisted" with a value of "TRUE", another's may return the field "black_listed" with a value of "yes", and another's may not return the field at all.

In some senses, "events" can be conceptualized as drivers behind changes in state of objects 130. One example of such driver may include a first credit card transaction acting as a trigger for processes 170 to change a parameter 140 of an object 130 representing the credit card holder from a state (parameter 140 value) of "inactive" to "active". In keeping with this conceptualization, the absence of an "event" can itself be an event. By way of some non-limiting examples: a credit card holder going 60 days without a credit card transaction, or an online shopper going 24 hours with items in a checkout "basket" without clicking the "check out" button, may be the "event" upon which platform 100 takes action.

d. Counter 150

Platform 100 may comprise a counter 150. Counters 150 may store information about queue 120 or object 130. For example, a counter 150 may store information about the number of objects 130 in queue 120. For another example, a counter 150 may store the timestamp of each object's 130 entrance into queue 120. Counter 150 may store other information (i.e. "custom counters") about objects 130 in the queue 120. By way of some non-limiting examples of counters 150: how many objects 130 representing callers have a parameter 140 of "VIP" set to "TRUE", how many objects 130 representing potential loan customers do not contain a parameter 140 of "credit score", or how many objects 130 representing internet of things (IoT) devices fall within a particular geographic region.

Counters 150 may be utilized by processes 170 to set limits according to business logic. For example, a counter 150 of the queue 120 of active chats with a customer service agent may be utilized to triage away additional incoming chat instances (objects 130) once the queue 120 reaches 10. This could service the business logic "agents are allowed to chat with a maximum of 10 customers at one time." For another example, a counter 150 of the timestamps of entry of tasks 130 into the queue 120 of a node 110 signifying a caller ready to be connected with an operator may be utilized to calculate the time since entry. This could be utilized in implementing the business logic "no caller (who reaches this point in the call system) should wait more than 30 seconds to speak with a human."

e. Function 160

Platform 100 may comprise a function 160. A node's 110 function 160 may operate on a counter 150 or on a parameter 140 of an object 130 in the queue 120 of that node 110. Functions 160 may be categorized in various ways; examples of functions 160 include calls to APIs 161 and to external (or internal) systems and interfaces in general, calls for manual input 162, calls to other processes 170*b* (which may include a process 170 calling itself), execution of code 163, calls to databases 164, system actions 165. System actions 165 may comprise such actions as applying a conditional (e.g. comparison operators, logical operators, bit-wise operators, regular expressions, etc.), waiting for a response, delaying further processing, error handling, setting a parameter 140, establishing a queue 120 for another process 170 to process, performing mathematical operations, employing a source of randomness (e.g. a hardware or software random number generator), setting a state, and issuing a notification. General UCE 110 functions 160 may comprise counter functions 166 that operate on counters

150. Counter functions 166 may be based upon such counter 150 values as the number of objects 130 in queue 120, the timestamp of objects' 130 entry into queue 120, or other counters 150. There may be overlap between various categorizations, especially with the relatively encompassing function 160 of executing code 163.

Figure 3:
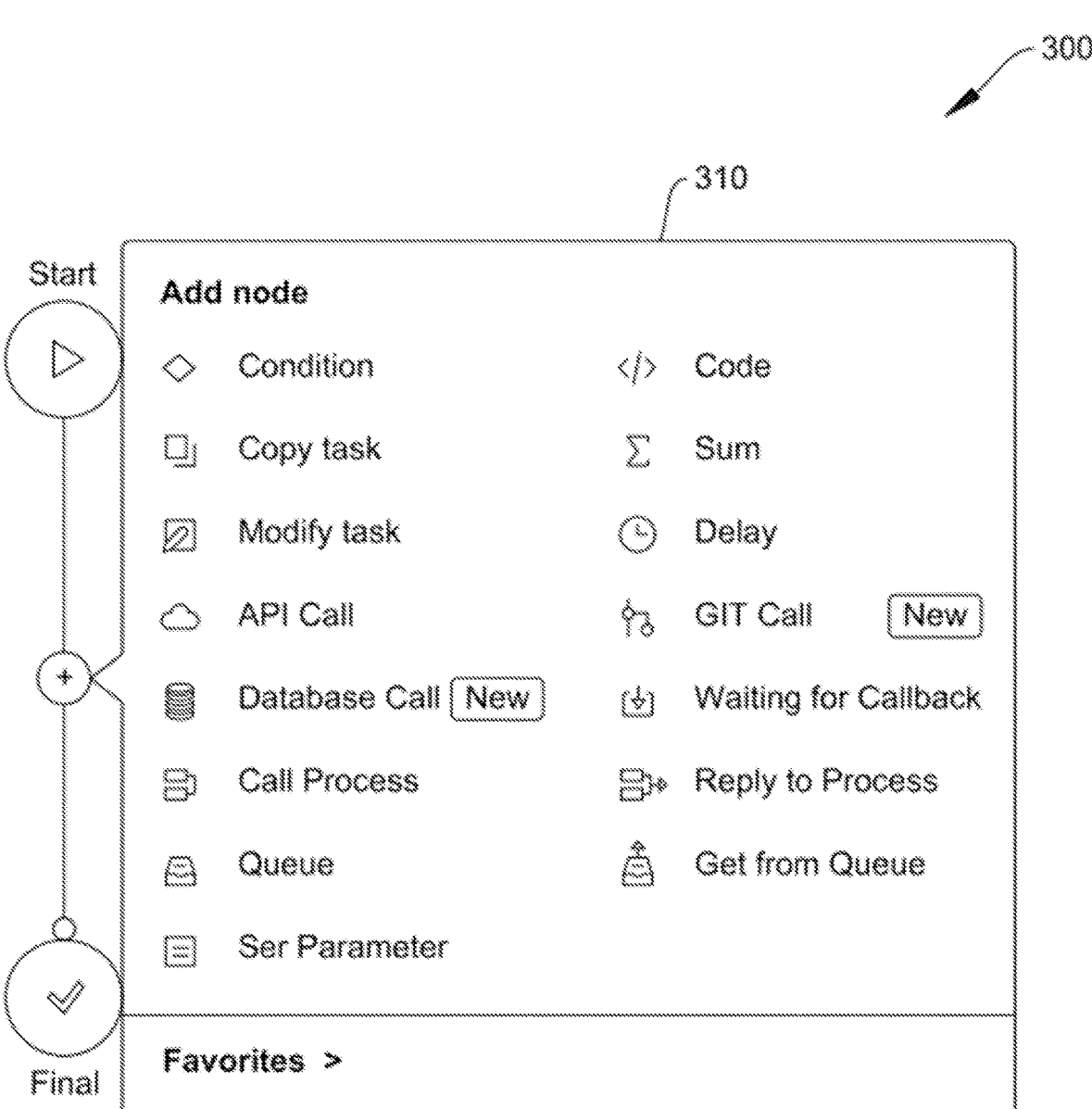
FIG. 3 illustrates an example interface to the disclosed platform showing an example implementation in accordance with various embodiments of the present disclosure.

Some depictions of example interfaces to platform 100, showing example implementations of various functions 160, follow. FIG. 3 depicts an example interface to platform 100 showing example implementation 300. In example implementation 300, an interface 310 may present a "menu" of available types of node 110. In an example user interface to platform 100 consistent with that depicted in FIG. 3, a user may, upon interacting with (e.g. mousing over, clicking) an interconnection between a first and a second node 110, be presented with an interface for creating a new node 110 interposed between the extant interconnected nodes 110. Such an interface may present the user with a "menu" of available types of nodes 110 (i.e. UCEs 110 classified by the type of predetermined function 160 with which they are to be created). Upon the user's selection of a particular type of node 110 from the "menu", platform 100 may create a new node 110 interposed between the two extant nodes 110—that is, the new node 110 may be a recipient of an interconnection from the first node and the originator of an interconnection to the second node 110.

Figure 4:
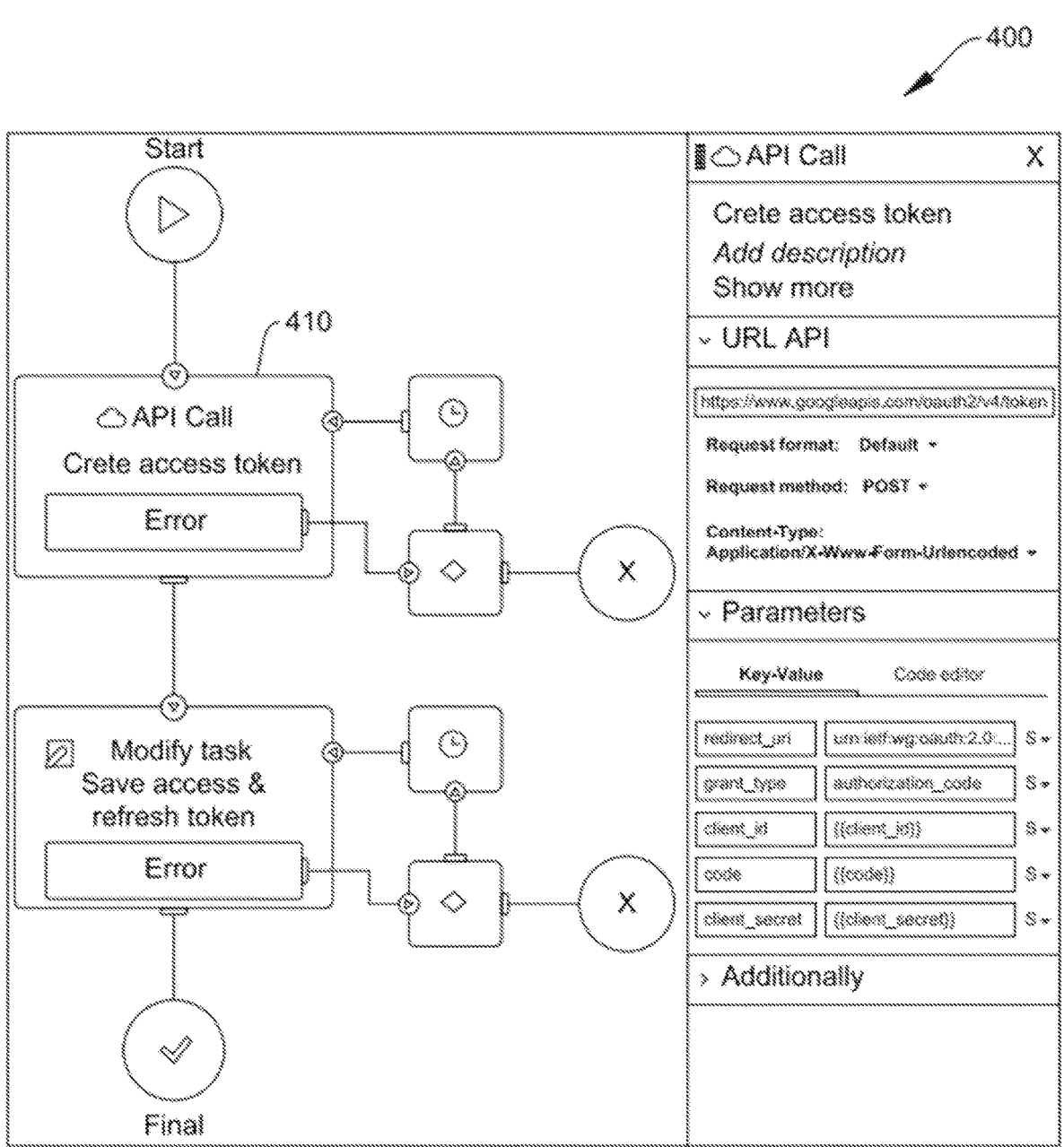
FIG. 4 illustrates an example interface to the disclosed platform showing an example implementation in accordance with various embodiments of the present disclosure.

FIG. 4 depicts an example interface to platform 100 showing example implementation 400. In example implementation 400, an API call node 410 is shown. A node 110 whose function 160 is an API call may be configured to communicate with an external system (which term may include an application programming interface to platform 100 itself) in a structured way. This structure may be reflected in data and inputs presented to a user upon selecting in a user interface to platform 100 of an API call node 110, such as that depicted in FIG. 4. An API call may utilize a URL so that it may communicate with the external system, URL string parameters that may be included in the URL request string, an HTTP request method, etc. The various inputs to this example API call may be presented to a user in a user interface of platform 100.

In an example consistent with example implementation 400 as depicted in FIG. 4, a user may be provided appropriate inputs for the API call. Such inputs may include the API URL (e.g. a text box), request method (e.g. a dropdown selector providing choices such as "GET" and "POST"), URL string parameters (e.g. text boxes arranged as "name: value" pairs which may permit the selection of extant object 130 parameters 140), and additional settings for the API call (such as limiting the number of simultaneous requests to the API, header data, etc.).

Upon making an API call, the external system may apply its rules to the submitted query and take action thereupon. For example, the external system may return JSON formatted data to platform 100. An API call node 110 may receive the external system's response. The node 110 may utilize the external system's response by, for example, setting parameters 140 (of the object 130 that precipitated the API call) in accordance therewith. In an example, a call to a stock value API may return a dollar value and an associated timestamp. In this example, upon receipt, the calling node 110 may set parameters 140 of the object 130—already equipped with a value for "stock_ticker_symbol" but blank in the parameters 140 "value" and "value_timestamp"—to the returned values.

As with various types of node 110, a UCE 110 specialized to make API calls may, upon creation, be automatically provided by platform 100 with an error handling loop. Such an error handling loop may comprise a built-in conditional to route errors out of the API call node's 110 queue 120, a conditional node 110 to handle the type of error generated, one or more exit nodes 110, and a "retry" delay node 110 interconnecting back to the API call node 110.

Figure 5:
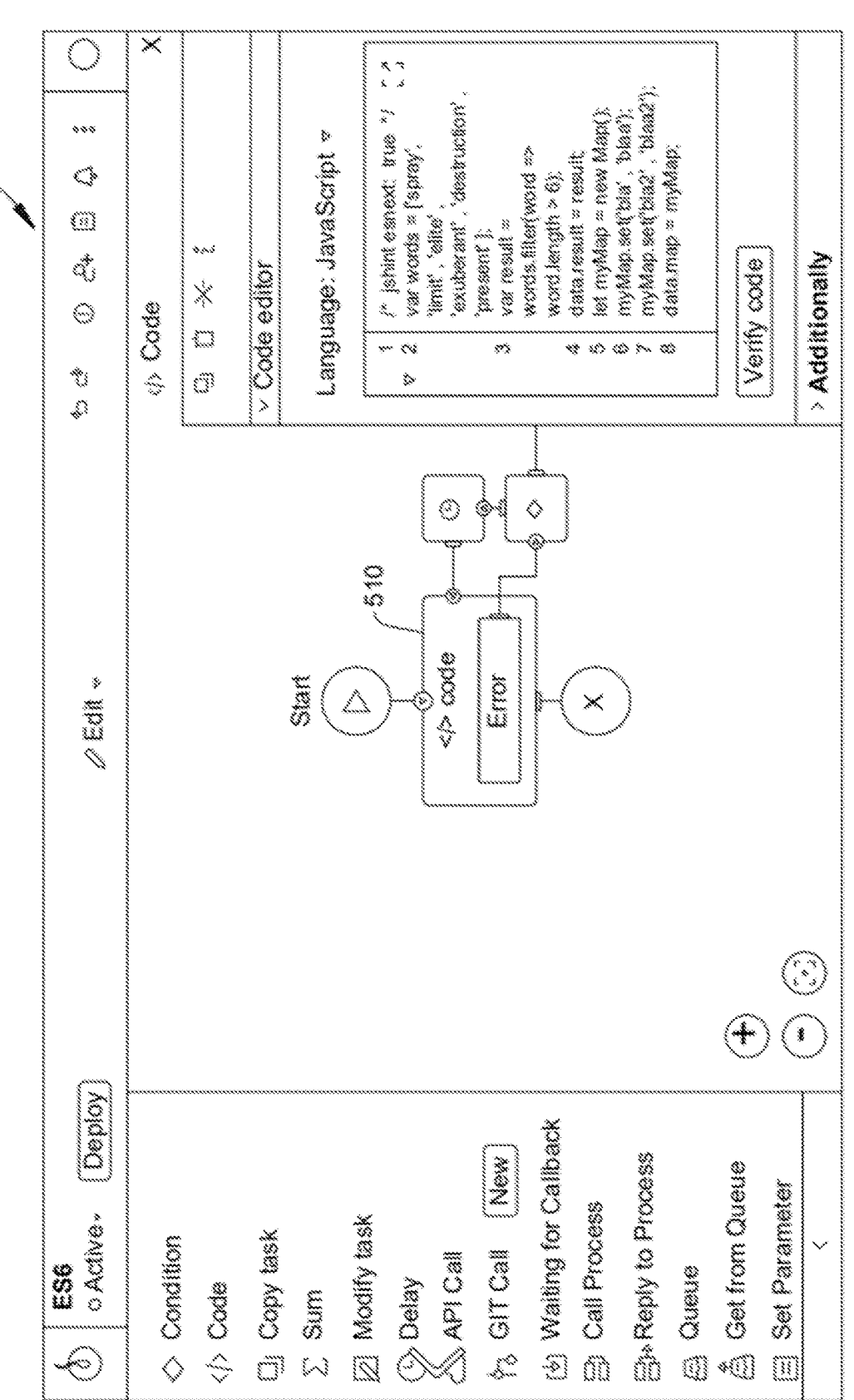
FIG. 5 illustrates an example interface to the disclosed platform showing an example implementation in accordance with various embodiments of the present disclosure.

FIG. 5 depicts an example interface to platform 100 showing example implementation 500. In example implementation 500, a code execution node 510 is shown. In some senses, code execution may be conceptualized as a specialization, in that, in a particular implementation of platform 100, only certain programming languages and functionality may be made available to a user. In some senses, code execution may be conceptualized as a more generalized case of function 160 types, in that other specializations (calling an API, calling a code versioning repository, delaying, applying conditional logic, etc.) could theoretically be performed by the execution of arbitrary code. In various embodiments, platform 100 may expose variables such as parameters 140 to code execution nodes 110. For example, an object's 130 parameter 140 "parameter_name" may be made available to a code execution node 110 as "data.parameter_name".

Figure 6:
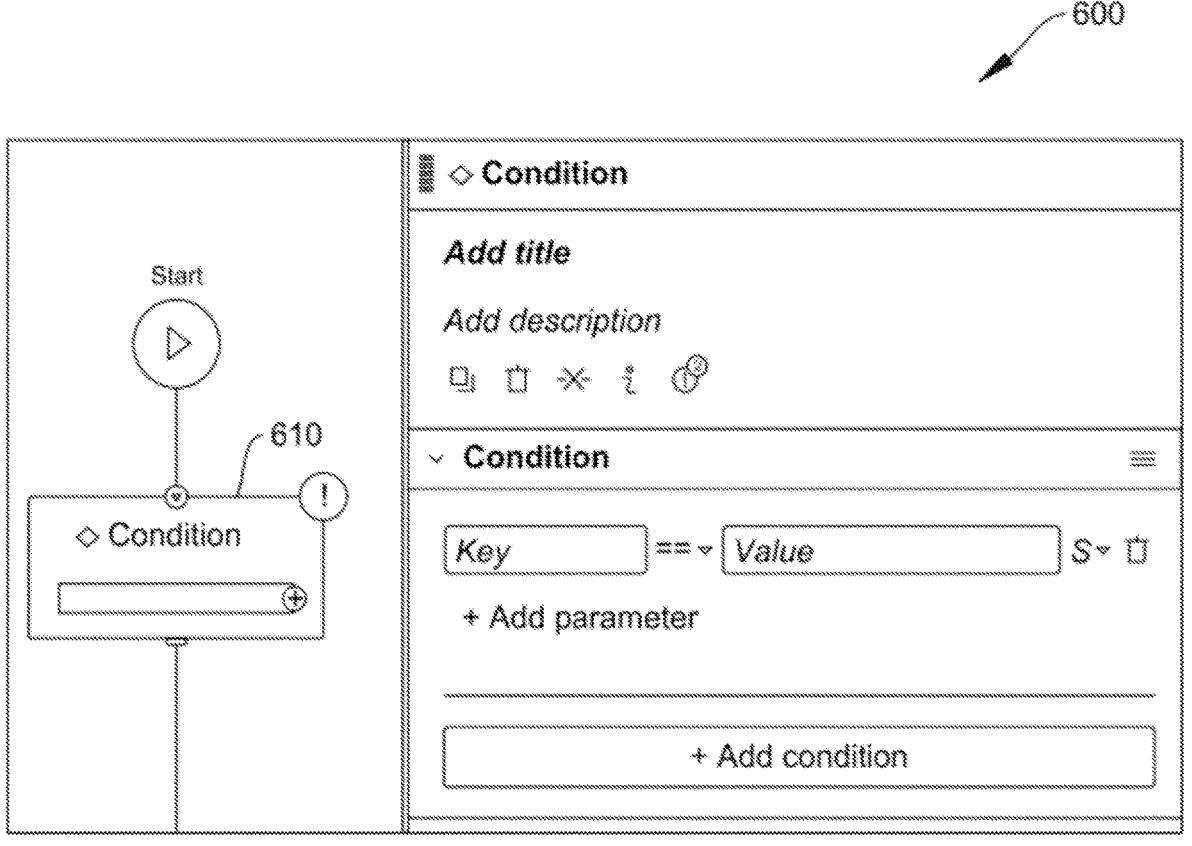
FIG. 6 illustrates an example interface to the disclosed platform showing an example implementation in accordance with various embodiments of the present disclosure.

FIG. 6 depicts an example interface to platform 100 showing example implementation 600. In example implementation 600, a conditional node 610 is shown. In various embodiments, a conditional node 110 may have an arbitrary number of conditions, each providing an originating interconnection point outbound to a node 110. In various embodiments, conditions may operate on object 130 parameters 140 (e.g. "IF vip==TRUE . . . "), on states resulting from lack of an object 130 (e.g. "IF_error==no_object"), on counters 150 (e.g. "IF c_t>30"), or combinations of the aforementioned.

In some embodiments, conditional nodes 110 may make only certain operators available in certain combinations. In an example, conditional nodes 110 may make only equality, inequality, greater than, less than, and regular expression matching available as conditions, and combinations of conditions only by AND OR logical operators. Different implementations of platform 100 may make available to conditional nodes 110 different subsets of the universe of comparison operators, logical operators, bitwise operators, regular expressions, etc.

Figure 7:
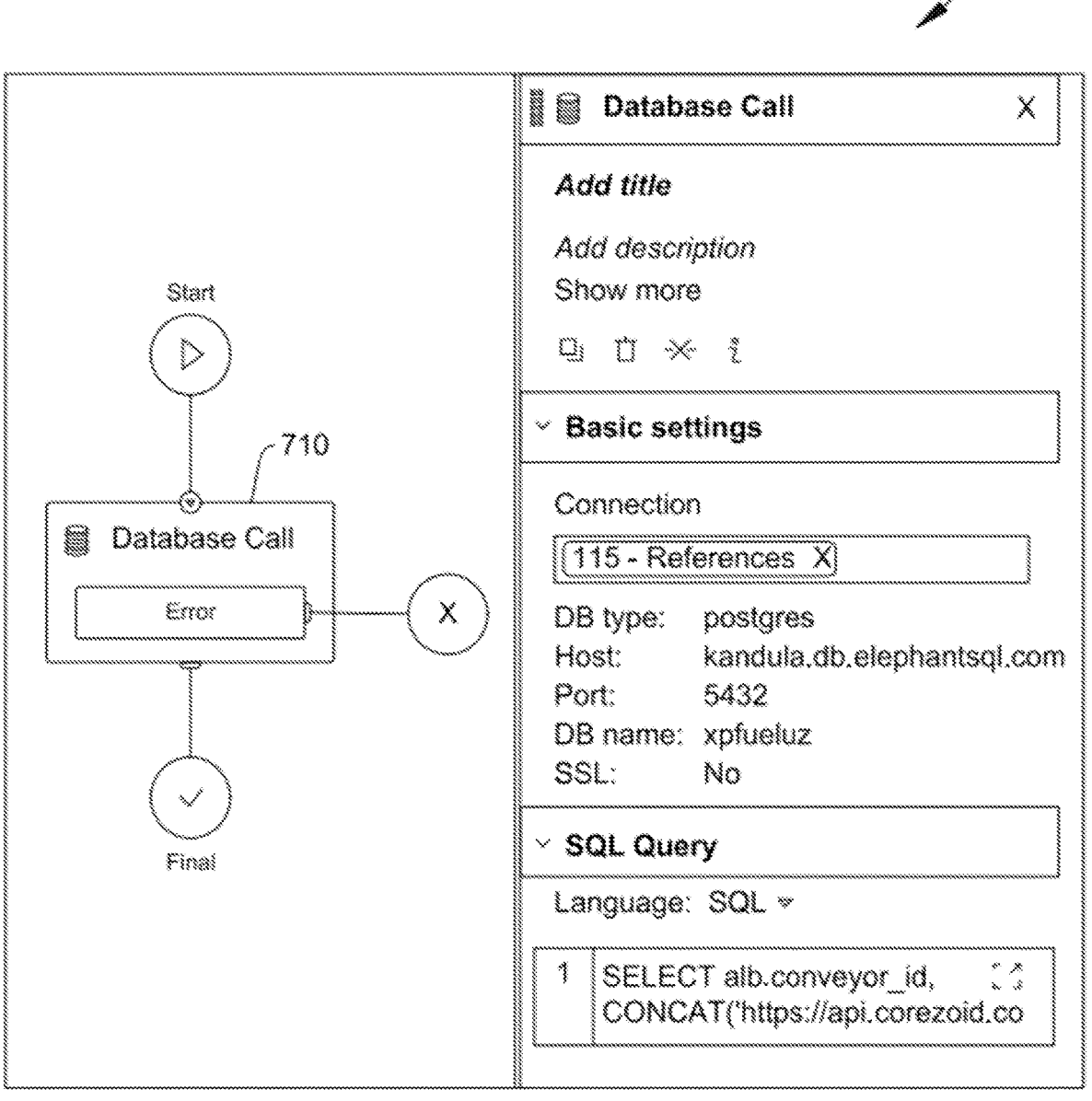
FIG. 7 illustrates an example interface to the disclosed platform showing an example implementation in accordance with various embodiments of the present disclosure.

FIG. 7 depicts an example interface to platform 100 showing example implementation 700. In example implementation 700, wherein a database call node 710 is shown. In an example, platform 100 may have an interface for setting up a database connection. In further consistent embodiments, a database call node 110 may reference a database connection. A user interface to platform 100 may provide an input field for making an actual query to the database in a language such as Structured Query Language (SQL), GraphQL, MongoDB Query Language (MQL), etc.

f. Analytics, Data Visualization, and Dashboard

Platform 100 may comprise analytics, data visualization, and dashboard functionality. In various embodiments, such functionality may be realtime as well as historical. In various embodiments, such functionality may be based on metrics (i.e. states of counters 150 and parameters 140) from any UCE 110. For example, a metric may correspond to a counter 150 of the number of objects 130 that have reached a successful end node 110 of a process 170. For another example, a metric may be based on a counter 150 of the number of objects 130 in a queue 120 of a particular node 110 having a parameter 140 that meets a particular criteria ("is_vip" is TRUE, "times_contacted" is less than or equal to 3, etc.).

In various embodiments, a dashboard may be capable of displaying metrics from multiple processes 170. In various embodiments, a dashboard may be capable of displaying different time ranges. Time ranges may include examples such as realtime, past 10 minutes, past hour, past 24 hours, past week, past year, and custom user-specified ranges. In further consistent embodiments, a dashboard may display metrics over those time ranges. By way of some non-limiting examples, a dashboard may display such metrics as: successful process 170 completions over the past 24 hours, current (realtime) number of users in the queue 120 of a particular node 110, process 170 failures due to API call errors over a particular two week period, etc.

In various embodiments, data visualizations of a dashboard may be available. Such data visualizations may include examples such as bar charts, pie charts, funnel charts, etc. Data visualizations may comprise, by way of some non-limiting examples: maps of processes 170 that display realtime or historical data about activity in various nodes 110, charts of the activity in interconnected processes 170, geographic visualizations (e.g. maps of where objects 130 are originating from, charts that show errors at a particular node 110 by country), heat maps, scatter plots, bubble charts, etc.

Figure 8A:
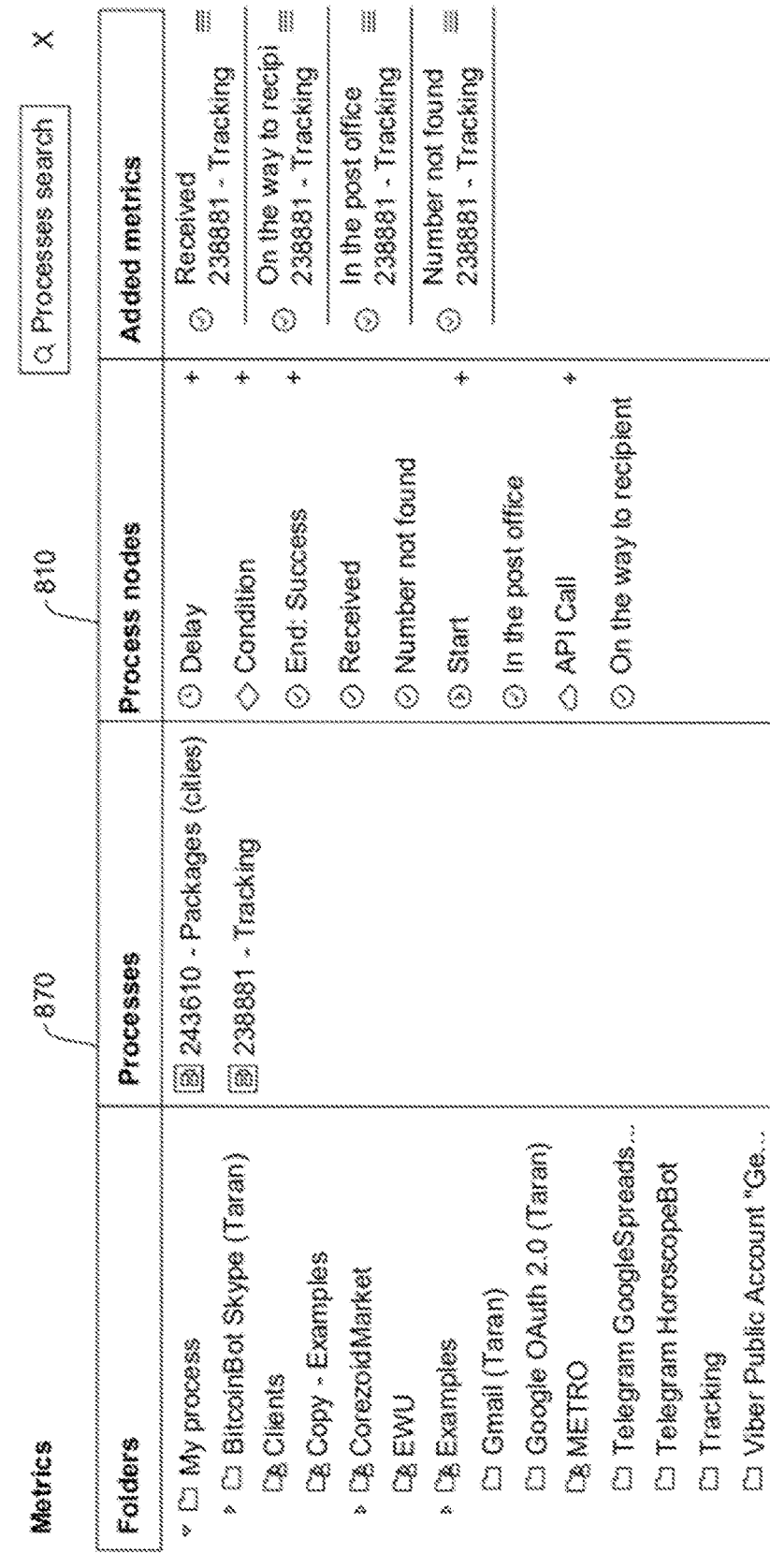
FIG. 8A illustrates an example interface to the disclosed platform showing an example implementation in accordance with various embodiments of the present disclosure.
Figure 8B:
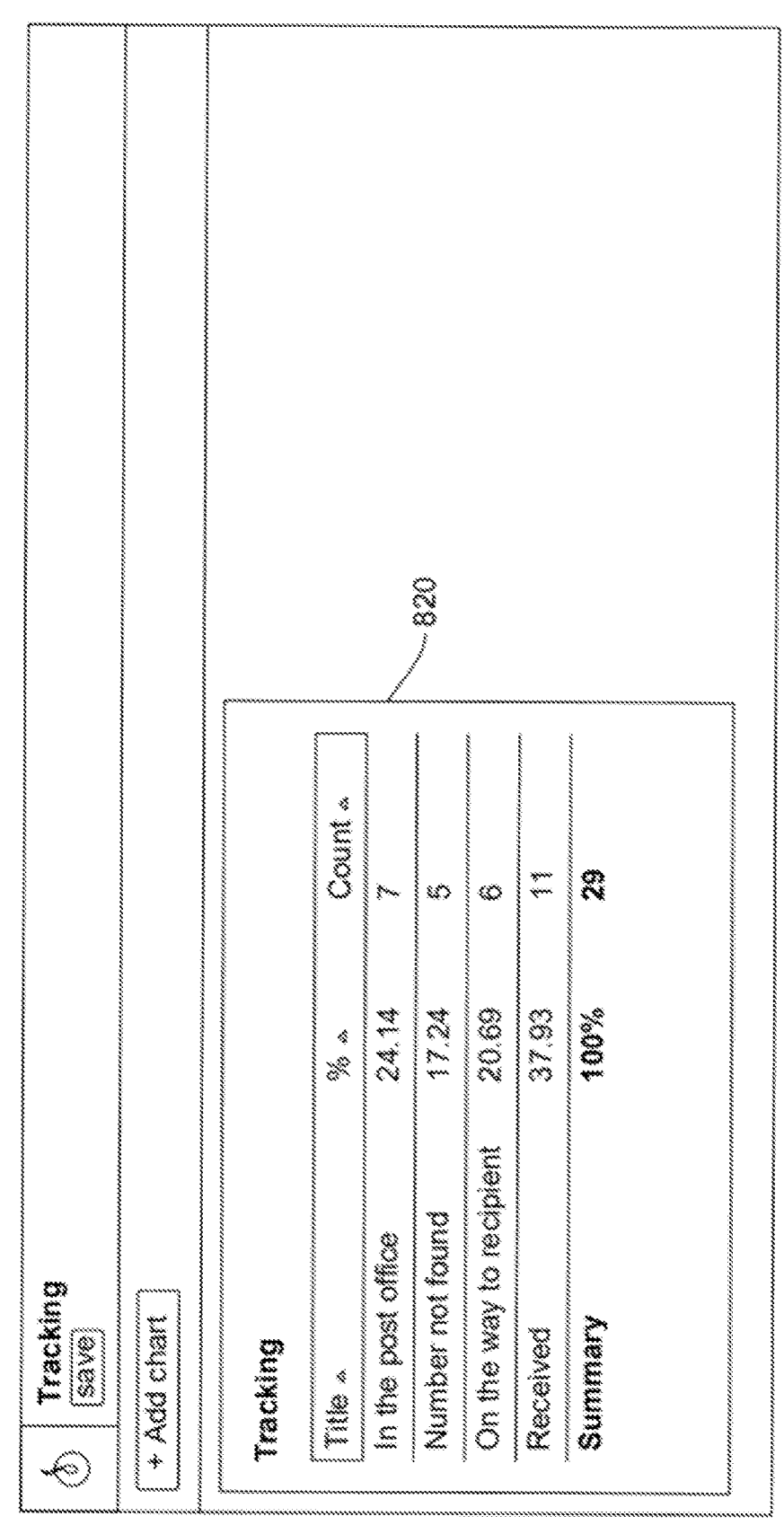
FIG. 8B illustrates an example interface to the disclosed platform showing an example implementation in accordance with various embodiments of the present disclosure.
Figure 8C:
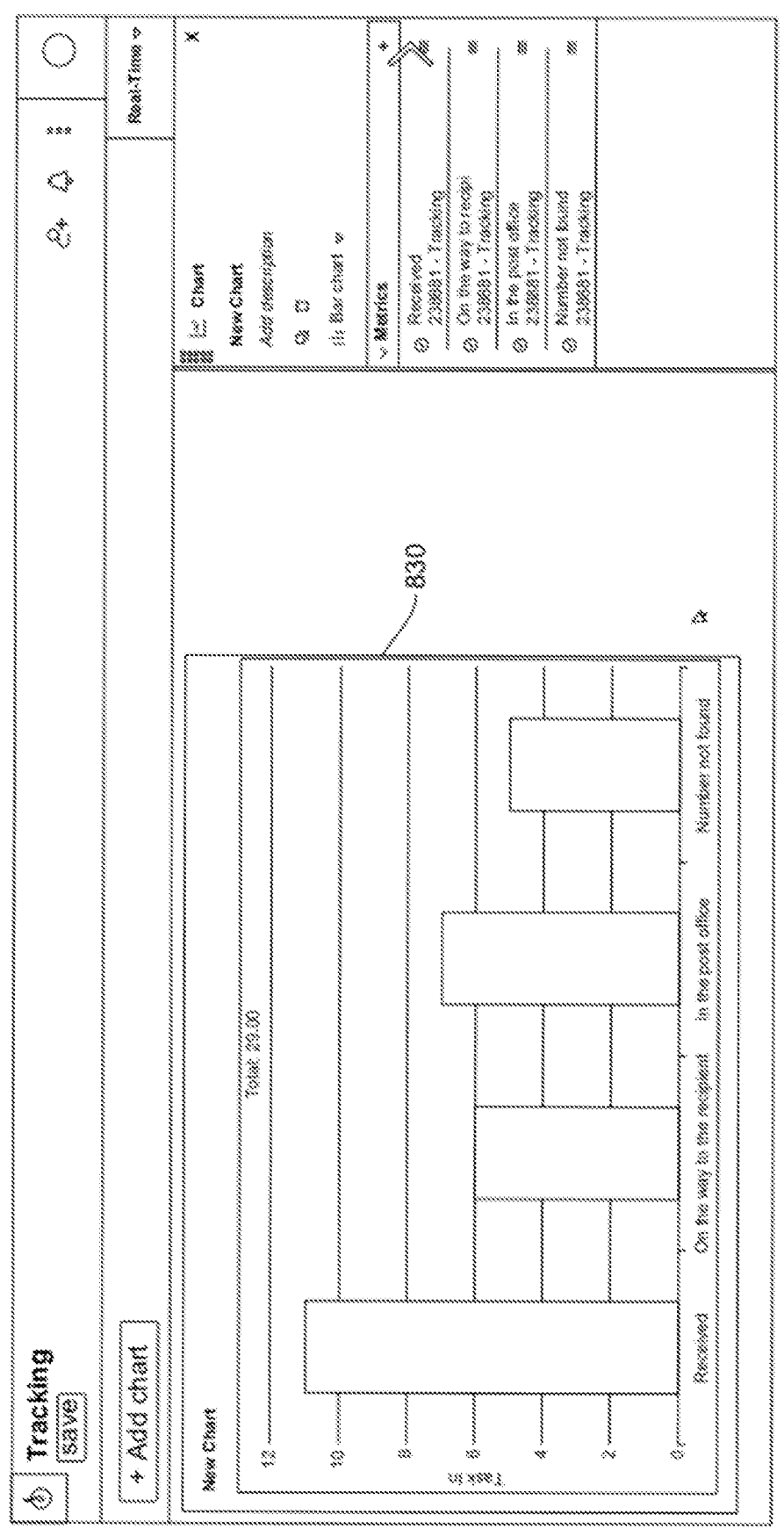
FIG. 8C illustrates an example interface to the disclosed platform showing an example implementation in accordance with various embodiments of the present disclosure.

An example interface to platform 100, implementing analytics, data visualization, and dashboard functionality, is depicted in FIGS. 8A-C. FIG. 8A depicts an example interface to platform 100 showing example implementation 800, wherein a selection (for inclusion in a dashboard) of metrics is presented for nodes 810 of processes 870. FIG. 8B depicts an example interface to platform 100 showing example implementation 800, wherein dashboard 820 (including chosen metrics from nodes 810) is shown. FIG. 8C depicts an example interface to platform 100 showing example implementation 800, wherein a data visualization 830 of dashboard 820 is shown. While each of the metrics selected in example implementation 800 are from a single process 170, entitled "Tracking", other processes 170 may have been included on the dashboard and related data visualization. For example, the process 170 "Packages (cities)" seen under processes 870 on FIG. 8A may have been chosen as a source of metrics.

II. Method of Use

Figure 9A:
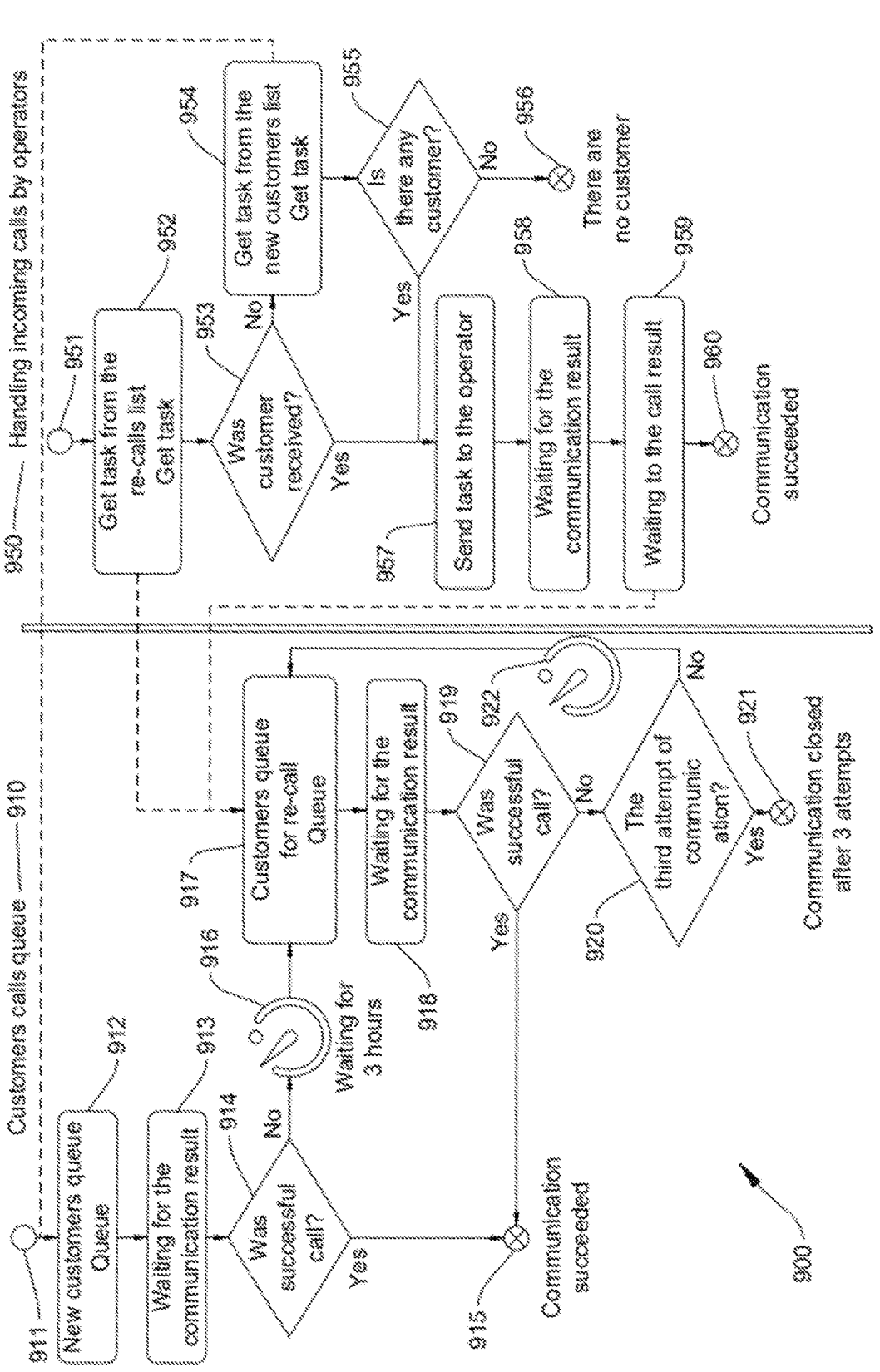
FIG. 9A illustrates a flowchart diagram of an example method in accordance with various embodiments of the present disclosure.
Figure 9B:
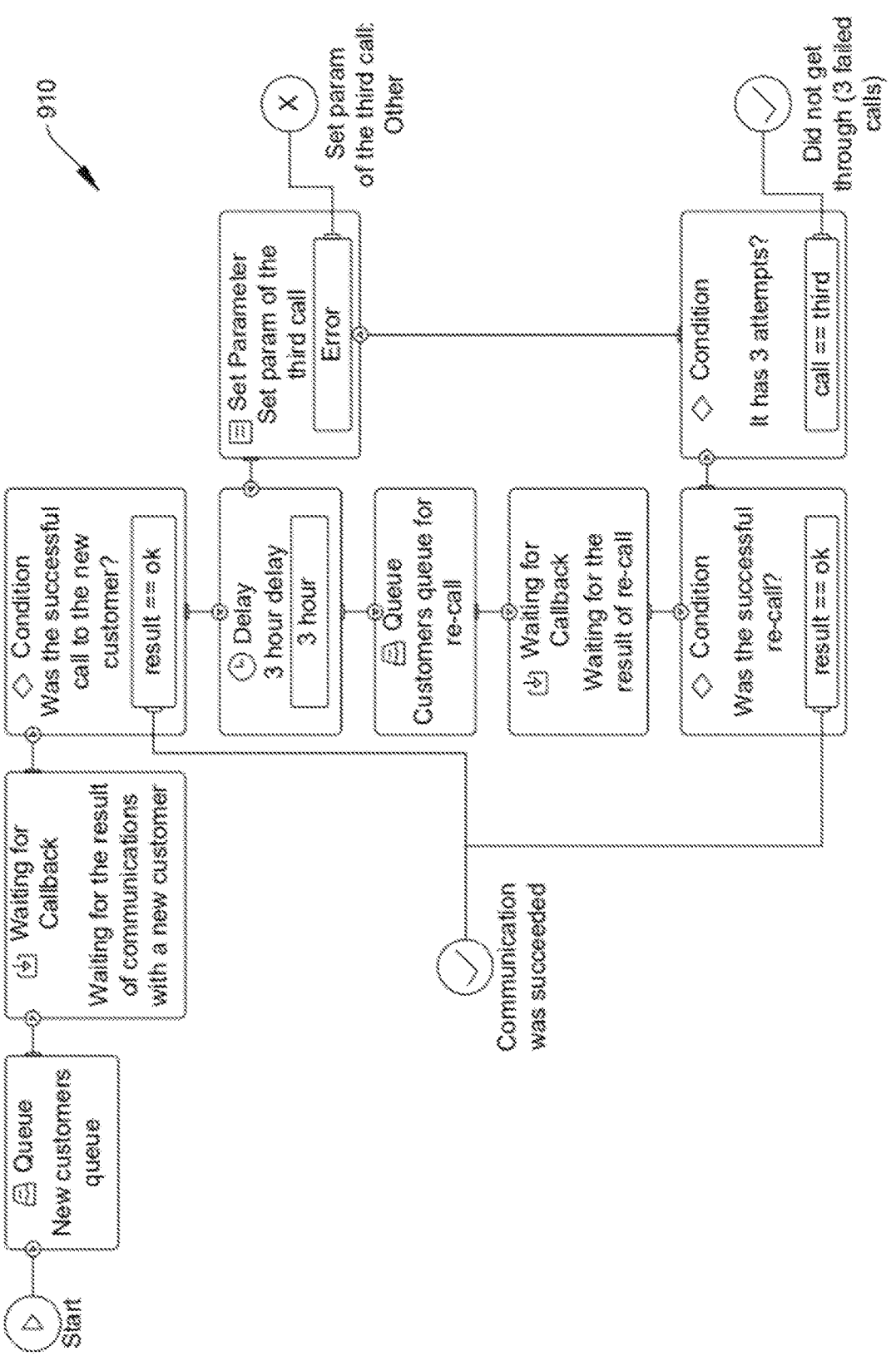
FIG. 9B illustrates an example interface to the disclosed platform showing an example implementation in accordance with various embodiments of the present disclosure.
Figure 9C:
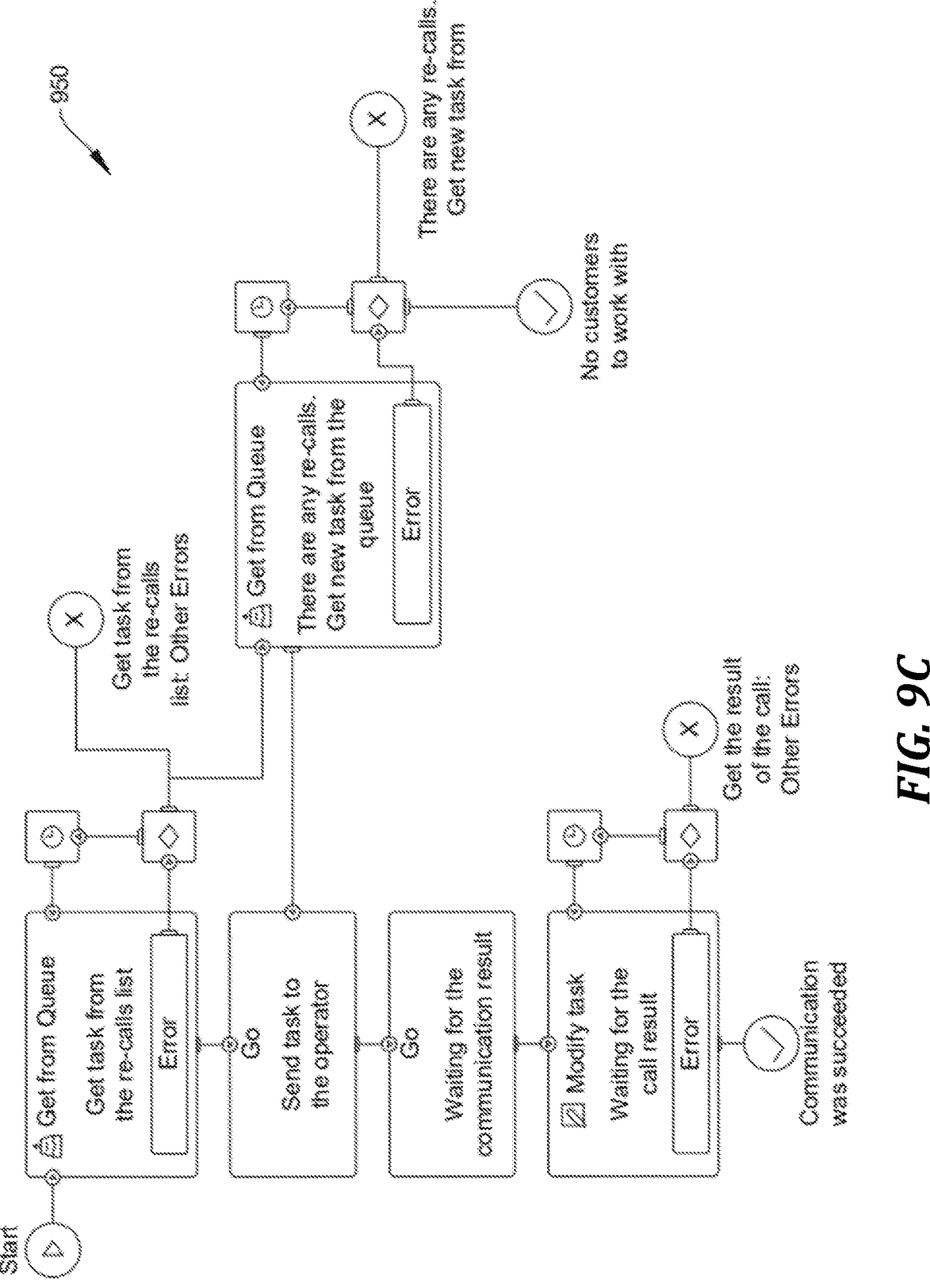
FIG. 9C illustrates an example interface to the disclosed platform showing an example implementation in accordance with various embodiments of the present disclosure.

Referring now to FIGS. 9A-C, there is shown an example method 900 of utilizing platform 100 to process inbound customer calls. FIG. 9A depicts the entire process in a flowchart diagram, including two subprocesses 910 and 950 of method 900. FIG. 9B depicts an example interface to platform 100 showing the implementation of subprocess 910 (or the "calls queue"). Example subprocess 910 may comprise a process 170 which may be responsible for maintaining the queue of customer calls (i.e. tracking changes in the state of calls). FIG. 9C depicts an example interface to platform 100 showing the implementation of subprocess 950 (or the "operator queue"). Example subprocess 950 may comprise a process 170 which may be responsible for processing of calls by an operator. Note that the term "queue" as used in "calls queue 910" and "operator queue 950" is in the general sense of processing callers, and not the queue 120 of an individual UCE 110.

g. Subprocess 910 (the "Calls Queue")

Method 900 may begin with a new customer call at stage 911, which may comprise the start node 110 of the calls queue 910. The customer call may be represented by an object 130. Object 130 may proceed to stage 912, which may comprise a node 110 that establishes a queue 120 for use by another process 170. In this example, at stage 912, a new customer call object 130 may be placed into a new customer call queue 120 for use by the operator queue 950. Subprocess 910 may wait for a response from the operator queue 950 (the result of attempting to communicate with the customer) at stage 913.

Stage 914 may comprise a conditional node 110. In this example, the conditional node 110 may apply the following logic: if the result from the operator queue 950 was a successful communication with the customer, object 130 may proceed to stage 915, which may be an end node 110 of subprocess 910 indicating successful communication. If the result from operator queue 950 was not a successful communication, object 130 may proceed to stage 916. Stage 916 may comprise a delay node 110 that holds object 130 for 3 hours before proceeding to stage 917.

Stage 917 may comprise a node 110 that establishes a queue 120 for use by another process 170. In this example, at stage 917, object 130 may be placed into a customer re-call queue 120 for use by the operator queue 950. Subprocess 910 may wait for a response from the operator queue 950 (the result of attempting to communicate with the customer) at stage 918.

Stage 919 may comprise a conditional node 110. In this example, the conditional node 110 may apply the following logic: if the result from the operator queue 950 was a successful communication with the customer on the re-call, object 130 may proceed to stage 915, which may be an end node 110 of subprocess 910 indicating successful communication. If the result from operator queue 950 was not a successful communication, object 130 may proceed to stage 920.

Stage 920 may comprise a conditional node 110. In this example, the conditional node 110 may apply the following logic: if object 130 has a call count parameter 140 indicating this was the third attempt to reach the customer, object may proceed to stage 921, which may be an end node 110 of subprocess 910 indicating communications were closed after 3 unsuccessful attempts. If object 130 does not have a call count parameter 140 indicating this was the third attempt to reach the customer, object 130 may proceed to a "Set Parameter" node 110 that sets the call count parameter 140 and on to stage 922 which may comprise the same delay node 110 as stage 916. Object 130 may then proceed (i.e. loop back) to stage 917 to the node 110 that, in this example, establishes the customer re-call queue 120 for use by subprocess 950.

h. Subprocess 950 (the "Operator Queue")

Meanwhile, subprocess 950 may begin at stage 951, which may comprise the start node 110 of the operator queue 950. Stage 952 may comprise a node 110 that attempts to get an object 130 from the (in this example, higher priority) customer re-call queue 120 populated at stage 917.

Stage 953 may comprise a conditional node 110. In this example, the conditional node 110 may apply the following logic: if the result of stage 952 is that no objects 130 are received (i.e. the customer re-call queue 120 is empty), method 900 may proceed to stage 954. Stage 954 may comprise a node 110 that attempts to get an object 130 from the (in this example, lower priority) new customer call queue 120 populated at stage 912.

Stage 955, may comprise a conditional node 110. In this example, the conditional node 110 may apply the following logic: if the result of stage 954 is that no objects 130 are received (i.e. the new customer call queue 120 is empty), method 900 may proceed to stage 956, which may be an end node 110 of subprocess 950 indicating there are no customers to contact.

If the result of either stage 954 or stage 952 is that an object 130 is received, object 130 may proceed (from stage 955 or stage 953, respectively) to stage 957. Stage 957 may comprise a node 110 which may send the object ("task") 130 to an operator to initiate communication. Subprocess 950 may await the results of that communication (e.g. successful or unsuccessful) at stage 958. Object 130 may proceed to stage 959. Stage 959 may comprise a "Modify Task" node 110 that utilizes the result of the communication (e.g. successful or unsuccessful) to update an object 130 in subprocess 910 waiting at either stage 913 or stage 918 for a response from the operator queue 950 (for new calls from stage 954 or re-calls from stage 952, respectively). Subprocess 950 may conclude with an end node 110 at stage 960.

The order of stages presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

III. Platform Architecture i. Architectural Implementations

FIG. 10 depicts a general architectural overview of an example implementation 1000 of platform 100. Example implementation 1000 may include API applications (including acceptance of requests, process management, managing state diagrams, etc.), counters 150, cache (i.e. memory), main logic applications (including most specialized UCE 110 functionality), HTTP applications (including outgoing API requests), user's code applications (including compilation and execution of arbitrary code as functions 160), the message queue (labeled "MQ"), and database (representing a storage medium in which platform 100 may be implemented).

FIG. 11 depicts a general architectural overview of an example implementation 1100 of platform 100. Example implementation 1100 may largely mirror example implementation 1000 as depicted in FIG. 10, with a key difference being this example system's 100 implementation in memory versus in a storage medium (compare positions of "Cache" and "Database" in FIG. 10 with positions of "DB", which stands for "database", and "Cache" in FIG. 11). Implementation of platform 100 in memory may have desirable effects such as enhanced efficiency and faster launch speed.

Figure 12:
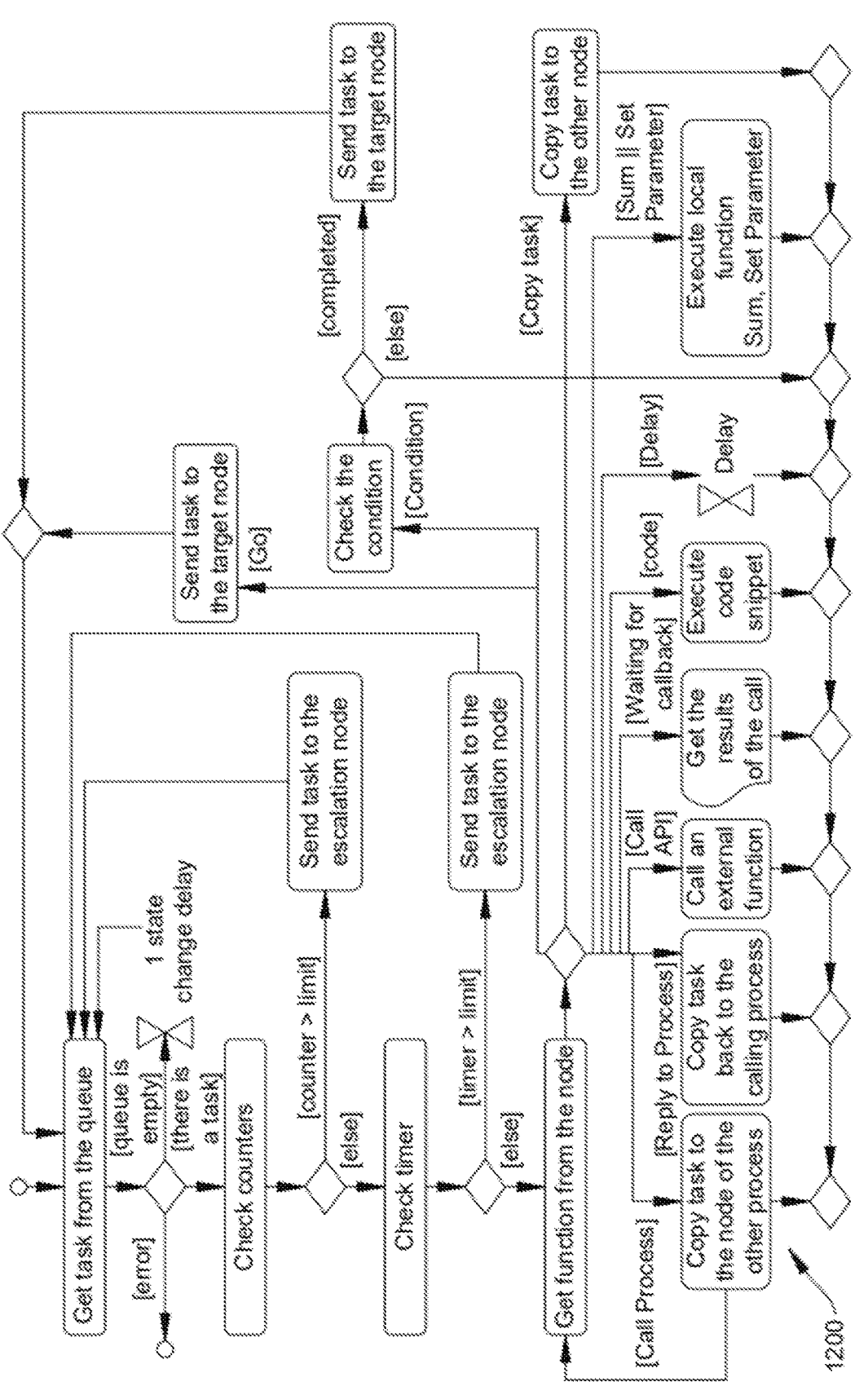
FIG. 12 illustrates simplified activity diagram of the interpretation algorithm in an example implementation of the disclosed platform in accordance with various embodiments of the present disclosure.

FIG. 12 depicts a simplified activity diagram of the interpretation algorithm 1200 that may run at each node 110 in an example implementation of platform 100. In various embodiments, the manner in which UCEs 110 may implement functions 160, check counters 150, and process objects 130 may be conceptualized in accordance with the simplified activity diagram of FIG. 12. The diagram is simplified in at least the following ways: not all erroneous situations and error handling points are depicted, not all functions 160 are depicted, details related to the transformation of data formats in the organization of external API calls are not depicted, the features of operation in start and end nodes 110 are not depicted, not all object 130 routing is depicted, etc.

Figure 13A:
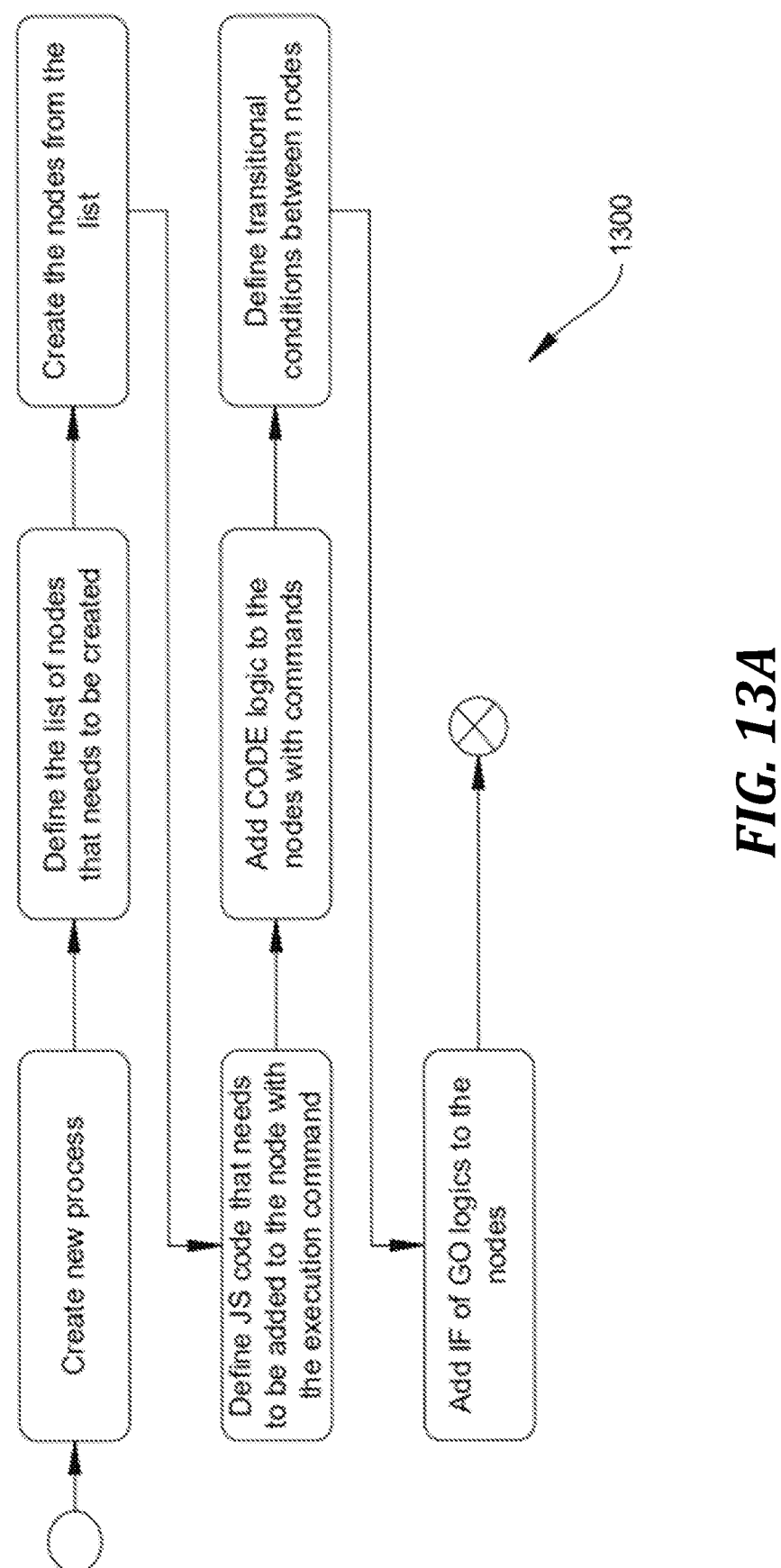
FIG. 13A illustrates a block diagram of an example implementation of the disclosed platform in accordance with various embodiments of the present disclosure.

An example implementation 1300 of platform 100 demonstrating Turing completeness is presented in FIGS. 13A-

Figure 13B:
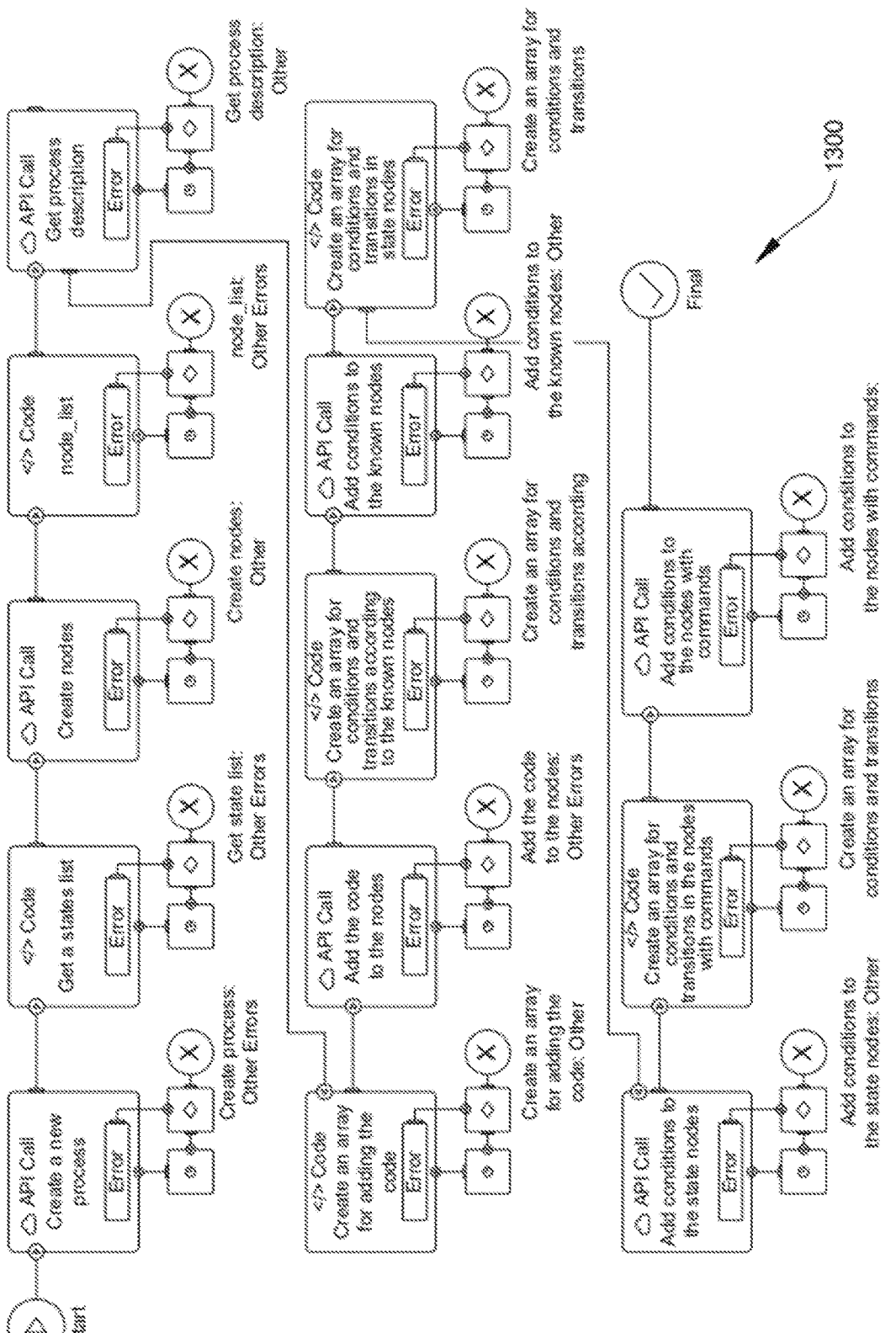
FIG. 13B illustrates an example interface to the disclosed platform showing an example implementation in accordance with various embodiments of the present disclosure.

B. FIG. 13A depicts a block diagram of example implementation 1300, while FIG. 13B depicts an example interface to platform 100 showing example implementation 1300.

j. System Implementations

Embodiments of platform 100 may comprise aspects including, but not limited to, mobile software applications (or "apps"), websites, web applications, desktop software, server software, embedded software, microcontrollers, databases, wired and wireless networking hardware and software, and various computing devices. Moreover, platform 100 or aspects thereof may be hosted one or more physical or virtual servers, cloud computing services, blockchain platforms, or distributed computing platforms. Alternatively, or in addition, platform 100 may be implemented in one or more of a plurality of computing devices.

Embodiments of the present disclosure may comprise a system having a central processing unit (CPU) 1420, a bus 1430, a memory unit 1440, a power supply unit (PSU) 1450, and one or more Input/Output (I/O) units. The CPU 1420 coupled to the memory unit 1440 and the plurality of I/O units 1460 via the bus 1430, all of which are powered by the PSU 1450. It should be understood that, in some embodiments, each disclosed unit may actually be a plurality of such units for the purposes of redundancy, high availability, and/or performance. The combination of the presently disclosed units is configured to perform the stages any method disclosed herein.

Figure 14:
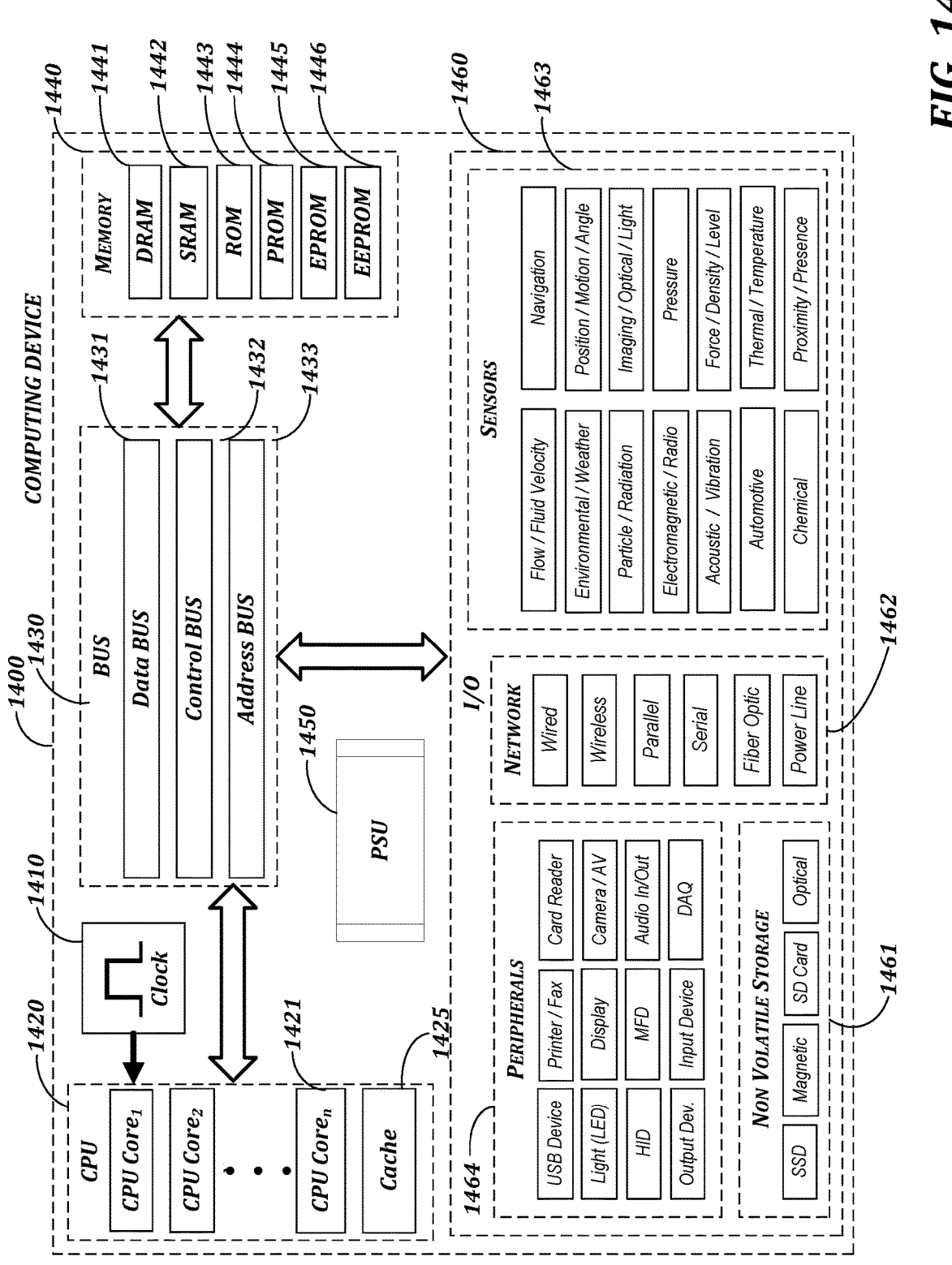
FIG. 14 illustrates a block diagram of a platform including a computing device in accordance with various embodiments of the present disclosure.

FIG. 14 is a block diagram of a system including computing device 1400. Consistent with an embodiment of the disclosure, the aforementioned CPU 1420, the bus 1430, the memory unit 1440, a PSU 1450, and the plurality of I/O units 1460 may be implemented in a computing device, such as computing device 1400 of FIG. 14. Any suitable combination of hardware, software, or firmware may be used to implement the aforementioned units. For example, the CPU 1420, the bus 1430, and the memory unit 1440 may be implemented with computing device 1400 or any of other computing devices 1400, in combination with computing device 1400. The aforementioned system, device, and components are examples and other systems, devices, and components may comprise the aforementioned CPU 1420, the bus 1430, the memory unit 1440, consistent with embodiments of the disclosure.

At least one computing device 1400 may be embodied as any of the computing elements illustrated in all of the attached figures. A computing device 1400 does not need to be electronic, nor even have a CPU 1420, nor bus 1430, nor memory unit 1440. The definition of the computing device 1400 to a person having ordinary skill in the art is "A device that computes, especially a programmable electronic machine that performs high-speed mathematical or logical operations or that assembles, stores, correlates, or otherwise processes information." Any device which processes information qualifies as a computing device 1400, especially if the processing is purposeful.

With reference to FIG. 14, a system consistent with an embodiment of the disclosure may include a computing device, such as computing device 1400. In a basic configuration, computing device 1400 may include at least one clock module 1410, at least one CPU 1420, at least one bus 1430, and at least one memory unit 1440, at least one PSU 1450, and at least one I/O 1460 module, wherein I/O module may be comprised of, but not limited to a non-volatile storage sub-module 1461, a communication sub-module 1462, a sensors sub-module 1463, and a peripherals sub-module 1464.

A system consistent with an embodiment of the disclosure the computing device 1400 may include the clock module 1410 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 1420, the central component of modern computers, which relies on a clock. The only exceptions are asynchronous circuits such as asynchronous CPUs. The clock 1410 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 1400 use a "clock multiplier" which multiplies a lower frequency external clock to the appropriate clock rate of the CPU 1420. This may allow the CPU 1420 to operate at a much higher frequency than the rest of the computer, which affords performance gains in situations where the CPU 1420 does not need to wait on an external factor (like memory 1440 or input/output 1460). Some embodiments of the clock 1410 may include dynamic frequency change, where, the time between clock edges can vary widely from one edge to the next and back again.

A system consistent with an embodiment of the disclosure the computing device 1400 may include the CPU unit 1420 comprising at least one CPU Core 1421. A plurality of CPU cores 1421 may comprise identical CPU cores 1421, such as, but not limited to, homogeneous multi-core systems. It is also possible for the plurality of CPU cores 1421 to comprise different CPU cores 1421, such as, but not limited to, heterogeneous multi-core systems, big.LITTLE systems and some AMD accelerated processing units (APU). The CPU unit 1420 reads and executes program instructions which may be used across many application domains, for example, but not limited to, general purpose computing, embedded computing, network computing, digital signal processing (DSP), and graphics processing (GPU). The CPU unit 1420 may run multiple instructions on separate CPU cores 1421 at the same time. The CPU unit 1420 may be integrated into at least one of a single integrated circuit die and multiple dies in a single chip package. The single integrated circuit die and multiple dies in a single chip package may contain a plurality of other aspects of the computing device 1400, for example, but not limited to, the clock 1410, the CPU 1420, the bus 1430, the memory 1440, and I/O 1460.

The CPU unit 1420 may contain cache 1422 such as, but not limited to, a level 1 cache, level 2 cache, level 3 cache or combination thereof. The aforementioned cache 1422 may or may not be shared amongst a plurality of CPU cores 1421. The cache 1422 sharing comprises at least one of message passing and inter-core communication methods may be used for the at least one CPU Core 1421 to communicate with the cache 1422. The inter-core communication methods may comprise, but not limited to, bus, ring, two-dimensional mesh, and crossbar. The aforementioned CPU unit 1420 may employ symmetric multiprocessing (SMP) design.

The plurality of the aforementioned CPU cores 1421 may comprise soft microprocessor cores on a single field programmable gate array (FPGA), such as semiconductor intellectual property cores (IP Core). The plurality of CPU cores 1421 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 1421, for example, but not limited to Instruction-level parallelism (ILP) such as, but not limited to, super-scalar pipelining, and Thread-level parallelism (TLP).

Consistent with the embodiments of the present disclosure, the aforementioned computing device 1400 may employ a communication system that transfers data between components inside the aforementioned computing device 1400, and/or the plurality of computing devices 1400. The aforementioned communication system will be known to a person having ordinary skill in the art as a bus 1430. The bus 1430 may embody internal and/or external plurality of hardware and software components, for example, but not limited to a wire, optical fiber, communication protocols, and any physical arrangement that provides the same logical function as a parallel electrical bus. The bus 1430 may comprise at least one of, but not limited to a parallel bus, wherein the parallel bus carry data words in parallel on multiple wires, and a serial bus, wherein the serial bus carry data in bit-serial form. The bus 1430 may embody a plurality of topologies, for example, but not limited to, a multidrop/electrical parallel topology, a daisy chain topology, and a connected by switched hubs, such as USB bus. The bus 1430 may comprise a plurality of embodiments, for example, but not limited to:

Internal data bus (data bus) 1431/Memory bus

Control bus 1432

Address bus 1433

System Management Bus (SMBus)

Front-Side-Bus (FSB)

External Bus Interface (EBI)

Local bus

Expansion bus

Lightning bus

Controller Area Network (CAN bus)

Camera Link

ExpressCard

Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)

HyperTransport

InfiniBand

RapidIO

Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 1400 may employ hardware integrated circuits that store information for immediate use in the computing device 1400, know to the person having ordinary skill in the art as primary storage or memory 1440. The memory 1440 operates at high speed, distinguishing it from the non-volatile storage sub-module 1461, which may be referred to as secondary or tertiary storage, which provides slow-to-access information but offers higher capacities at lower cost. The contents contained in memory 1440, may be transferred to secondary storage via techniques such as, but not limited to, virtual memory and swap. The memory 1440 may be associated with addressable semiconductor memory, such as integrated circuits consisting of silicon-based transistors, used for example as primary storage but also other purposes in the computing device 1400. The memory 1440 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 1441, Static Random-Access Memory (SRAM) 1442, CPU Cache memory 1425, Advanced Random-Access Memory (A-RAM), and other types of primary storage such as Random-Access Memory (RAM).

Non-volatile memory which can retain stored information even after power is removed, for example, but not limited to, Read-Only Memory (ROM) 1443, Programmable ROM (PROM) 1444, Erasable PROM (EPROM) 1445, Electrically Erasable PROM (EEPROM) 1446 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 1400 may employ the communication system between an information processing system, such as the computing device 1400, and the outside world, for example, but not limited to, human, environment, and another computing device 1400. The aforementioned communication system will be known to a person having ordinary skill in the art as I/O 1460. The I/O module 1460 regulates a plurality of inputs and outputs with regard to the computing device 1400, wherein the inputs are a plurality of signals and data received by the computing device 1400, and the outputs are the plurality of signals and data sent from the computing device 1400. The I/O module 1460 interfaces a plurality of hardware, such as, but not limited to, non-volatile storage 1461, communication devices 1462, sensors 1463, and peripherals 1464. The plurality of hardware is used by the at least one of, but not limited to, human, environment, and another computing device 1400 to communicate with the present computing device 1400. The I/O module 1460 may comprise a plurality of forms, for example, but not limited to channel I/O, port mapped I/O, asynchronous I/O, and Direct Memory Access (DMA).

Consistent with the embodiments of the present disclosure, the aforementioned computing device 1400 may employ the non-volatile storage sub-module 1461, which may be referred to by a person having ordinary skill in the art as one of secondary storage, external memory, tertiary storage, off-line storage, and auxiliary storage. The non-volatile storage sub-module 1461 may not be accessed directly by the CPU 1420 without using intermediate area in the memory 1440. The non-volatile storage sub-module 1461 does not lose data when power is removed and may be two orders of magnitude less costly than storage used in memory module, at the expense of speed and latency. The non-volatile storage sub-module 1461 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (1461) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, Compact-Flash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD)

Molecular Memory

Deoxyribonucleic Acid (DNA) digital data storage

Consistent with the embodiments of the present disclosure, the aforementioned computing device 1400 may employ the communication sub-module 1462 as a subset of the I/O 1460, which may be referred to by a person having ordinary skill in the art as at least one of, but not limited to, computer network, data network, and network. The network allows computing devices 1400 to exchange data using connections, which may be known to a person having ordinary skill in the art as data links, between network nodes. The nodes comprise network computer devices 1400 that originate, route, and terminate data. The nodes are identified by network addresses and can include a plurality of hosts consistent with the embodiments of a computing device 1400. The aforementioned embodiments include, but not limited to personal computers, phones, servers, drones, and networking devices such as, but not limited to, hubs, switches, routers, modems, and firewalls.

Two nodes can be said are networked together, when one computing device 1400 is able to exchange information with the other computing device 1400, whether or not they have a direct connection with each other. The communication sub-module 1462 supports a plurality of applications and services, such as, but not limited to World Wide Web (WWW), digital video and audio, shared use of application and storage computing devices 1400, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 1462 may comprise a plurality of size, topology, traffic control mechanism and organizational intent. The communication sub-module 1462 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 1400 may employ the sensors sub-module 1463 as a subset of the I/O 1460. The sensors sub-module 1463 comprises at least one of the devices, modules, and subsystems whose purpose is to detect events or changes in its environment and send the information to the computing device 1400. Sensors are sensitive to the measured property, are not sensitive to any property not measured, but may be encountered in its application, and do not significantly influence the measured property. The sensors sub-module 1463 may comprise a plurality of digital devices and analog devices, wherein if an analog device is used, an Analog to Digital (A-to-D) converter must be employed to interface the said device with the computing device 1400. The sensors may be subject to a plurality of deviations that limit sensor accuracy. The sensors sub-module 1463 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 1400 may employ the peripherals sub-module 1464 as a subset of the I/O 1460. The peripheral sub-module 1464 comprises ancillary devices uses to put information into and get information out of the computing device 1400. There are 3 categories of devices comprising the peripheral sub-module 1464, which exist based on their relationship with the computing device 1400, input devices, output devices, and input/output devices. Input devices send at least one of data and instructions to the computing device 1400. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 1400. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 1464:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 1400. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 1400 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 1400. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 1462 sub-module), data storage device (non-volatile storage 1461), facsimile (FAX), and graphics/sound cards.

IV. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A non-transitory computer-readable medium comprising instructions, that when read by a processor configured to host a plurality of universal computing elements (UCEs), cause the processor to perform:

receiving, by a first UCE associated with a process, from at least one application programming interface, a second UCE associated with another process of a first object;

transmitting, by the first UCE, information comprising at least one parameter of the first object to the second UCE;

creating, by the second UCE, a second object comprising the at least one parameter of the first object;

receiving, by the second UCE, the second object;

transmitting, by the second UCE, a request to an application programming interface (API);

setting, by the second UCE, at least one parameter of the second object based on at least one of: a successful response from the API, an error response from the API, and a lack of response from the API;

receiving, by a third UCE of a second process, the second object;

transmitting, by the third UCE of the second process, information comprising the at least one parameter of the second object to the second UCE of the first process;

receiving, by the second UCE of a first process, the first object; and setting, by the second UCE of the first process, at least one parameter of the first object based on the information comprising the at least one parameter of the second object.

2. The non-transitory computer-readable medium of claim 1 comprising instructions, that when read by the processor, cause the processor to execute a dashboard configured to display at least one metric, wherein the at least one metric is derived from at least one counter of the plurality of the UCEs.

3. The non-transitory computer-readable medium of claim 2 comprising instructions, that when read by the processor, cause the processor to generate a data visualization element configured to display graphical data based on the at least one metric.

4. The non-transitory computer-readable medium of claim 2 comprising instructions, that when read by the processor, cause the processor to execute the at least one counter configured to represent a number of objects in a queue, and a counter for each object in the queue representing object's time of entry into the queue.

5. The non-transitory computer-readable medium of claim 2 comprising instructions, that when read by the processor, cause the processor to cause the plurality of UCEs to perform any of:

applying a conditional, the conditional comprising at least one of a comparison operator, a logical operator, and a regular expression, copying an object in this process to another process, modifying an object in another process, an application programming interface call, a database call, a call to another process, establishing a queue for use by another process, setting at least one of one or more parameters of an object in this process, executing code, a mathematical operation, a delay, a call to a code versioning repository, waiting for a response, replying to another process, getting an object from a queue established in another process, setting a state, handling error states, issuing an alert, a generator of randomness, and a timer.

6. The non-transitory computer-readable medium of claim 5 comprising instructions, that when read by the processor, cause the processor to execute at least a process comprising the first process comprising a first UCE configured to call the second process and establish a queue for use by the second process and second UCE configured to wait for a response from the second process.

7. The non-transitory computer-readable medium of claim 1 comprising instructions, that when read by the processor, cause the processor to host the plurality of the UCEs comprising at least three UCEs, wherein one of the UCEs comprises a start node, and one of the UCEs comprises an end node.

8. The non-transitory computer-readable medium of claim 1 comprising instructions, that when read by the processor, cause the processor to provide interconnection between the plurality of the UCEs.

9. The non-transitory computer-readable medium of claim 1 comprising instructions, that when read by the processor, cause the processor to execute at least one process comprising the first process comprising a first UCE configured to communicate with the second process, and a second UCE configured to await communication back from the second process.

10. The non-transitory computer-readable medium of claim 1 comprising instructions, that when read by the processor, cause the processor to support a user interface that enables drag-and-drop creation, selection, interconnection, and modification of the plurality of the UCEs.

11. The non-transitory computer-readable medium of claim 10 comprising instructions, that when read by the processor, cause the processor to support the user interface comprising a visual mapping of each of the plurality of the UCEs and interconnections among the plurality of the UCEs.

12. The non-transitory computer-readable medium of claim 10 comprising instructions, that when read by the processor, cause the processor to support the user interface comprising a display of pertinent data and inputs upon selecting a UCE from the plurality of the UCEs.

13. The non-transitory computer-readable medium of claim 10 comprising instructions, that when read by the processor, cause the processor to support the user interface comprising automatically creating and interconnecting a second, error handling UCE upon creation of a first UCE.

14. The non-transitory computer-readable medium of claim 10 comprising instructions, that when read by the processor, cause the processor to generate a library configured to store and present templates comprising a preconfigured collection of the UCEs.

15. A method for processing data of external services, the method comprising:

receiving, by a first universal computing element (UCE) associated with a process, from at least one application programming interface (API), a second UCE associated with another process of a first object;

transmitting, by the first UCE, information comprising at least one parameter of the first object to the second UCE;

creating, by the second UCE, a second object comprising the at least one parameter of the first object;

receiving, by the second UCE, the second object;

transmitting, by the second UCE, a request to the API;

setting, by the second UCE, at least one parameter of the second object based on at least one of: a successful response from the API, an error response from the API, and a lack of response from the API;

receiving, by a third UCE of a second process, the second object;

transmitting, by the third UCE of the second process, information comprising the at least one parameter of the second object to the second UCE of the first process;

receiving, by the second UCE of a first process, the first object; and setting, by the second UCE of the first process, at least one parameter of the first object based on the information comprising the at least one parameter of the second object.

16. The method of claim 15, further comprising an additional UCE-A, wherein a functionality of the UCE-A comprises applying a conditional execution, the conditional execution comprising any of:

copying an object in this process to another process, modifying an object in another process, an application programming interface call, a database call, a call to another process, establishing a queue for use by another process, setting at least one of one or more parameters of an object in this process, executing code, a mathematical operation, a delay, a call to a code versioning repository, waiting for a response, replying to another process, getting an object from a queue established in another process, setting a state, handling error states, issuing an alert, a generator of randomness, and a timer.

17. The method of claim 16, further comprising setting, by the UCE-A, at least one parameter of the first object and the second object.

18. The method of claim 15, further comprising:

the second process further comprises an error handling loop for the second UCE of the second process, the error handling loop comprising an outbound interconnection from the second UCE of the second process to a conditional UCE, an outbound interconnection from the conditional UCE to a delay UCE, and an outbound interconnection from the delay UCE to the second UCE of the second process;

the setting, by the second UCE of the second process, of the at least one parameter of the second object based on at least one of an error response from the API and a lack of response from the API; and receiving, by the conditional UCE, the second object.

19. A system comprising:

a processor configured to host a plurality of universal computing elements (UCEs); and a memory on which are stored machine-readable instructions that when executed by the processor, cause the processor to:

receive, by a first universal computing element (UCE) associated with a process, from at least one application programming interface (API), a second UCE associated with another process of a first object;

transmit, by the first UCE, information comprising at least one parameter of the first object to the second UCE;

create, by the second UCE, a second object comprising the at least one parameter of the first object;

receive, by the second UCE, the second object;

transmit, by the second UCE, a request to the API;

set, by the second UCE, at least one parameter of the second object based on at least one of: a successful response from the API, an error response from the API, and a lack of response from the API;

receive, by a third UCE of a second process, the second object;

transmit, by the third UCE of the second process, information comprising the at least one parameter of the second object to the second UCE of the first process;

receive, by the second UCE of a first process, the first object; and set, by the second UCE of the first process, at least one parameter of the first object based on the information comprising the at least one parameter of the second object.

20. The system of claim 19, further comprising a user interface configured to enable drag-and-drop creation, selection, interconnection, and modification of the plurality of the UCEs.

\* \* \* \* \*